US011188985B1

(12) United States Patent
Lietz et al.

(10) Patent No.: US 11,188,985 B1
(45) Date of Patent: Nov. 30, 2021

(54) ENTITY PRIORITIZATION AND ANALYSIS SYSTEMS

(71) Applicant: AON RISK SERVICES, INC. OF MARYLAND, New York, NY (US)

(72) Inventors: Derek Charles Lietz, Boston, MA (US); Nicholas Joseph Chmielewski, Chicago, IL (US); Vinayak Thiagarajan, Chicago, IL (US); Daniel Crouse, Seattle, WA (US); Iulia A. Neagu, Boston, MA (US)

(73) Assignee: AON RISK SERVICES, INC. OF MARYLAND, New York, NY (US)

( * ) Notice: Subject to any disclaimer, the term of this patent is extended or adjusted under 35 U.S.C. 154(b) by 0 days.

(21) Appl. No.: 16/542,931

(22) Filed: Aug. 16, 2019

Related U.S. Application Data

(60) Provisional application No. 62/855,520, filed on May 31, 2019.

(51) Int. Cl.
*G06Q 40/08* (2012.01)
*G06Q 50/18* (2012.01)

(52) U.S. Cl.
CPC ........... *G06Q 40/08* (2013.01); *G06Q 50/184* (2013.01)

(58) Field of Classification Search
CPC .............................. G06Q 40/08; G06Q 50/184
See application file for complete search history.

(56) References Cited

U.S. PATENT DOCUMENTS

| 7,536,331 | B1* | 5/2009 | Pellegrino | G06Q 40/00 |
| | | | | 705/35 |
| 9,177,349 | B2* | 11/2015 | Barney | G06Q 50/184 |
| 9,449,281 | B2* | 9/2016 | Basel | G06N 20/00 |
| 9,680,855 | B2* | 6/2017 | Schultz | G06Q 10/0635 |
| 2002/0077870 | A1* | 6/2002 | Wilkinson | G06Q 40/08 |
| | | | | 705/4 |
| 2003/0097282 | A1* | 5/2003 | Guse | G06Q 40/08 |
| | | | | 705/4 |
| 2009/0254971 | A1* | 10/2009 | Herz | G06Q 30/0603 |
| | | | | 726/1 |
| 2011/0184766 | A1* | 7/2011 | Virdhagriswaran | |
| | | | | G06Q 30/0601 |
| | | | | 705/4 |
| 2013/0339063 | A1* | 12/2013 | Malackowski | G06Q 10/067 |
| | | | | 705/4 |
| 2014/0330594 | A1* | 11/2014 | Roberts | G06Q 10/06316 |
| | | | | 705/4 |
| 2015/0039351 | A1* | 2/2015 | Bell | G06Q 40/08 |
| | | | | 705/4 |

(Continued)

FOREIGN PATENT DOCUMENTS

TW 201019248 A * 11/2008

*Primary Examiner* — Scott C Anderson
*Assistant Examiner* — Matthew Cobb
(74) *Attorney, Agent, or Firm* — Lee & Hayes, P.C.

(57) ABSTRACT

Systems and methods for entity prioritization and analysis are disclosed. For example, entity data may be received and utilized by one or more predictive models to generate entity ratings associated with a likelihood that the entities will be involved in defending an intellectual-property claim and a severity of loss associated with defending such a claim. A ranking of entities may also be generated indicating which entities are most likely to acquire an insurance policy insuring against an intellectual-property claim.

18 Claims, 8 Drawing Sheets

(56) References Cited

U.S. PATENT DOCUMENTS

| | | | |
|---|---|---|---|
| 2015/0381649 A1* | 12/2015 | Schultz | H04L 63/1433 |
| | | | 726/25 |
| 2016/0117770 A1* | 4/2016 | Graham | G06Q 40/04 |
| | | | 705/37 |
| 2016/0232631 A1* | 8/2016 | Young | G06Q 50/18 |
| 2017/0132706 A1* | 5/2017 | Kariv | G06Q 40/025 |
| 2018/0060969 A1* | 3/2018 | MacInnis | G06F 16/9535 |
| 2018/0285996 A1* | 10/2018 | Ma | G06F 16/2428 |
| 2020/0380606 A1* | 12/2020 | Chmielewski | G06Q 40/08 |

* cited by examiner

ENTITY PRIORITIZATION AND ANALYSIS SYSTEMS

RELATED APPLICATION

This application claims the benefit of priority to provisional U.S. Patent Application Ser. No. 62/855,520, filed on May 31, 2019 and entitled "Entity Prioritization and Analysis Systems", which is herein incorporated by reference in its entirety.

BACKGROUND

Litigation involving intellectual-property claims has been prevalent for some time. Defending against such claims may be costly and time consuming. Described herein are improvements in technology and solutions to technical problems that can be used to, among other things, assist in identifying entities likely to benefit from insurance covering intellectual-property claims and analyzing data associated with the entity.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
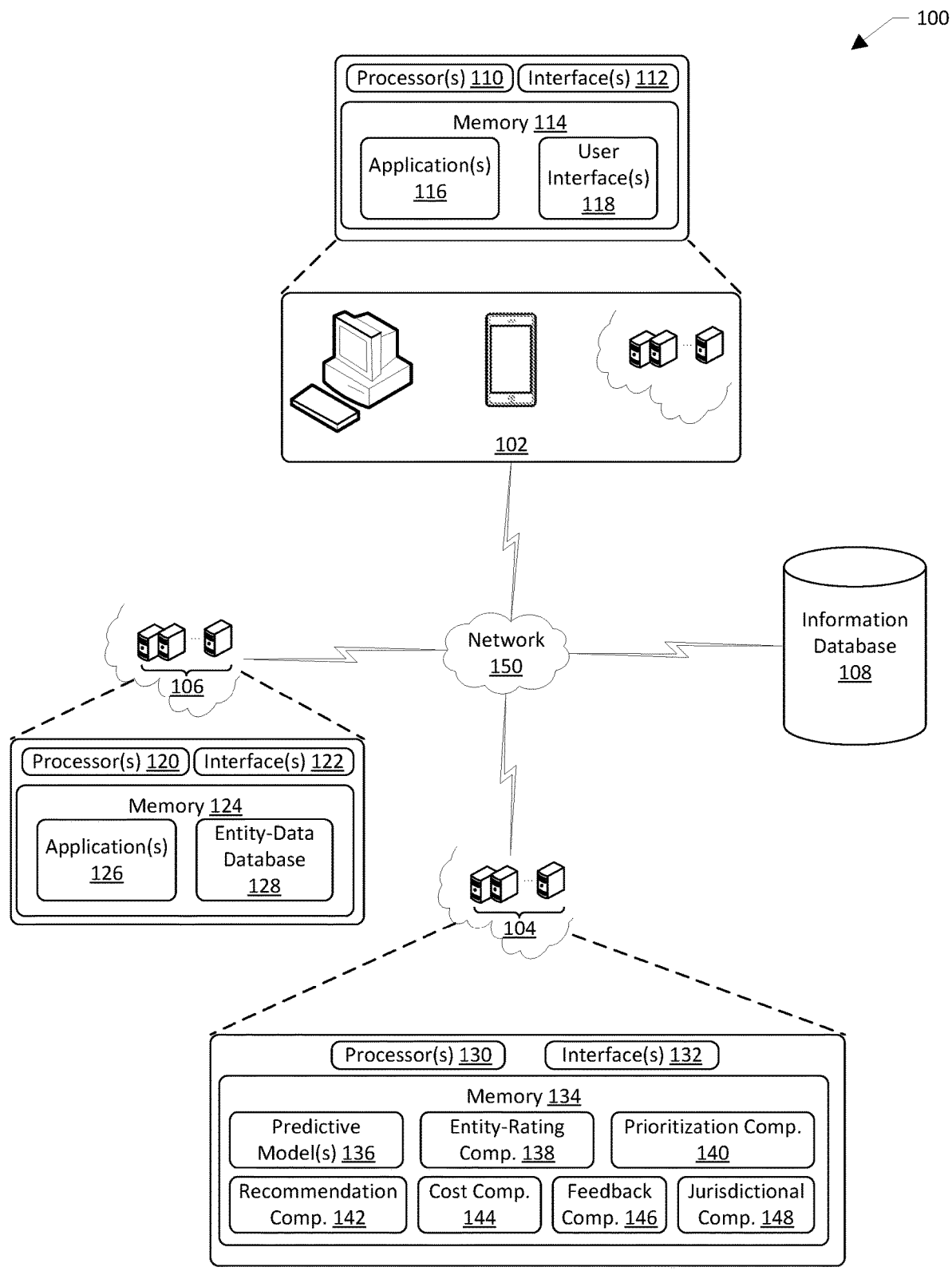
FIG. 1 illustrates a schematic diagram of an example architecture for entity prioritization and analysis.

Techniques and systems described herein are directed to evaluating degrees of exposure related to intellectual-property claims for one or more entities. Take, for example, an entity that sells goods and/or services in a market with one or more competitors. The competitors may have one or more intellectual property assets, such as patents, copyrights, trademarks, and/or trade secrets, that the competitors may attempt to assert against the entity. For example, one or more of the competitors may file a lawsuit claiming infringement and/or misappropriation of their intellectual-property assets. The entity may attempt to defend against such a lawsuit, but doing so is often expensive and time consuming. For many entities, the costs involved in defending against an intellectual-property claims are prohibitively high and would have a drastic negative impact on the entity and/or its business, regardless of and especially with a finding of liability. In these and other examples, an insurer may offer an insurance policy to insure the entity in the event that such an intellectual-property claim is levied against the entity.

Typically, insurance policies are issued to an individual, group of individuals, or an organization, which may be referred to as the entity and/or the insured, by an additional organization, which may be referred to as the insurer. In some scenarios, the insurer may provide the insured with a monetary payout when the insured incurs a loss that is covered by the insurance policy. Such losses may include, for example, damage awards, litigation expenses, settlements, indemnification obligations, court costs, and/or other monetary amounts associated with defending legal claims and/or complying with court orders. Often, the insured pays an amount to the insurer on a regular basis in order to keep the policy active. This amount may be referred to as a premium. Additionally, the insurance policy may place a limit on the amount of payout by the insurer to the insured in case of damages incurred by the insured covered under the policy. The maximum payout by the insurer may be referred to as the policy limit. Further, in various situations, the insurer and the insured may share the expense of the loss. The sharing of the expense of the loss may be expressed as a percentage of a given loss for which the insurer is responsible and a percentage of the given loss for which the insured is responsible. The sharing of the loss may be referred to as co-insurance. Additionally, in examples, retention values may be determined with respect to an insurance policy, where the insured may retain exposure up to a certain dollar amount and the insurer may pay damages above that retention value limit. However, insurance policies covering intellectual-property claims are not frequently offered, the premiums associated with such insurance policies may be expensive, and the terms and conditions of such insurance policies may not provide adequate coverage for the entity.

Described herein are systems and techniques that, among other things, prioritize entities that may be candidates for insurance policies that insure against intellectual-property claims. The systems and techniques may also analyze information associated with the entities to rate or otherwise evaluate a likelihood that a given entity will be involved in defending against an intellectual-property claim. For example, an insurer may maintain a database of information associated with entities that have acquired or applied for one or more insurance policies from the insurer. Those insurance policies may include, for example, general liability insurance, product liability insurance, etc., as well as IP infringement liability insurance. The information may include, for example, an identifier of a given entity, one or more industries associated with the entity, a revenue associated with the entity, a profit associated with the entity, an indication of intellectual-property litigation history, a number of employees associated with the entity, an indication of the insurance policies held by the entity, and/or a monetary amount paid by the entity to the insurer. In examples, at least a portion of this information may be publicly available and may be obtained from publicly-available databases. In further examples, at least a portion of this information may be stored with respect to a given entity, and the information may be obtained from systems and/or devices associated with the given entity upon receiving authorization to obtain such information from the entity.

The information described above may be received at a broker system and may be analyzed to determine a joint probability value indicating a likelihood and/or expected monetary amount of loss and/or associated information associated with a given entity. Additionally, or alternatively, the information described above may be identified, determined, and/or generated by the broker system. For example, the broker system may generate and maintain a predictive model configured to accept features and/or feature vectors corresponding to the entity information. For example, the entity information, when received by the broker system, may be formatted into a feature and/or feature vector for input into the predictive model. The predictive model may utilize the features and/or feature vectors to generate output data associated with the entity. For example, the output data may include a frequency value indicating an anticipated frequency of the entity being involved in defending against an intellectual-property claim. The output data may also include a severity value indicating a monetary amount and/or a range of monetary amounts of anticipated damage to the entity associated with the intellectual-property claim. The output data may also include an indication of a most-probable type of intellectual-property claim that may be levied against the entity based at least in part on the industry in which the entity operates and/or the products and/or services offered by the entity. The output data may also include a probability distribution of loss, which may represent a graph showing probabilities that a given loss amount will occur for the entity. The output data may also include one or more confidence values associated with other portions of the output data. By so doing, the broker system may generate data that indicates how likely a given entity is to be involved in defending against an intellectual-property claim and what the potential loss to the entity would be in the event that such as claim was levied against the entity.

The information described above may also be analyzed to determine a ranking of entities. For example, the broker system may score some or all of the entity information, otherwise described herein as characteristics, based at least in part on one or more machine learning models and/or utilizing heuristics. By way of example, each score may be on a given scale, such as from −5 to +5, with +5 representing a highest possible score for a given characteristic. For example, the industry associated with the entity may be scored, the revenue associated with the entity may be scored, the number of intellectual-property lawsuits that the entity has been involved in may be scored, the types of insurance policies held by the entity may be scored, and/or the monetary amount paid to the insurer may be scored. Some or all of the scores may be weighted based at least in part on, for example, the industry associated with the entity and/or prior rankings performed by the broker system. The scores and/or weighted scores may be aggregated to generate a prioritization value for a given entity. The prioritization value may be analyzed in association with one or more other prioritization values associated with other entities to generate a ranking of the entities. By so doing, the broker system may determine which entities are most likely to acquire and/or benefit from an insurance policy insuring against intellectual-property claims.

Additionally, or alternatively, the broker system may be configured to determine one or more terms of the insurance policy, such as a cost of holding the insurance policy by a given entity. For example, the broker system may determine a loss-probability distribution associated with a potential intellectual-property claim based at least in part on the entity information described above. Additionally, the broker system may determine certain terms of a potential insurance policy that would be desired and/or reasonable in light of the loss-probability distribution, such as, for example, a policy limit, a retention amount, and/or a copayment amount and/or percentage. Based at least in part on the determined terms, the loss-probability distribution, and/or one or more other factors, such as the output data as described above, the broker system may determine an estimated and/or recommended cost to the insured to hold the insurance policy. The recommended cost may be a total cost and/or an amount of a premium amount to be charged to the entity.

Additionally, or alternatively, the broker system may utilize information associated with intellectual property owned by the entity for determining liability probability. For example, a given entity may not own intellectual property assets. In this situation, the entity may be more vulnerable to an intellectual-property claim because, for example, the entity has not acquired intellectual-property rights to innovation in the industry in which the entity is operating and/or because the entity would not have potential counterclaims for infringement against a would-be plaintiff. In other examples, a given entity may own intellectual property assets, and in these examples, the broker system may receive information indicating the intellectual property associated with the entity and may determine a degree of coverage of the intellectual property with respect to the industry associated with the entity. In examples where the degree of coverage is high, the exposure potential for the entity may be decreased. This information may be utilized as a feature and/or feature vector and input into the predictive models described herein to generate output data. Additionally, the generated recommendation such as for the entity to acquire the insurance policy may indicate the degree of coverage and/or the intellectual property owned by the entity.

Additionally, or alternatively, the broker system may be configured to analyze the products and/or services offered by a given entity to determine countries in which the entity makes, uses, sells, or offers such products and/or services for sale. Based at least in part on this analysis, the broker system may identify one or more countries where an intellectual-property claim is likely to be asserted against the entity. The broker system may also determine, utilizing a predictive model, a weighting value associated with litigation in a given country. For example, a reference country, such as the United States, may be selected, and other countries may be assigned or associated with a discount factor indicating an increase or decrease in litigation costs associated with litigating an intellectual-property claim in those countries. The discount factor may be determined based at least in part on publicly-available or otherwise obtainable information regarding past intellectual-property lawsuits and the respective litigation costs and damage awards. This information may be utilized to generate features and/or feature vectors for input into a predictive model. The predictive model may generate the discount factor for a given country and for, in examples, a given industry, damage-amount ranges, entity sizes, etc. The discount factor may be applied to the severity value associated with potential damages for the country at issue.

Additionally, or alternatively, the broker system may be configured to analyze exposure and/or mitigation factors to determine liability probabilities and/or severities. For example, non-litigation factors such as settlements may be considered when information associated with such settlements is available. In examples, such information may be utilized to generate an initial recommendation for insuring a given entity and/or such information may be utilized iteratively to improve an initial recommendation and/or recommended policy terms. As such, information on which the broker system utilizes to generate recommendations may be updated and/or changed and may be utilized to update generated data and/or recommendations as described herein.

Additionally, or alternatively, the broker system may be configured to receive, from at least one of an insurer system associated with the insurer or an entity system associated with a given entity, feedback data indicating that a given entity acquired an insurance policy. For example, the recommendation described above may be sent to the insurer system and agents of the insurer may contact the entities listed in the ranking of entities. In other examples, agents of the broker system may contact the entities listed in the ranking of entities. Some of the entities may acquire the requested insurance policy, some may not. Information indicating which entities acquired the insurance policy, and which did not, and on what terms may be utilized to train the predictive models and/or scoring techniques such that subsequent modeling and/or techniques may be more accurate.

By implementing the techniques and systems described herein, the broker system may accurately and efficiently determine exposure metrics for various entities and generate terms for insurance policies based on the exposure metrics. In this way, the broker system may provide reliable predictions to insurers and insureds regarding losses incurred due to intellectual property adversarial proceedings. Accordingly, the insurers may offer insurance policies to the organizations that are commensurate to the exposure associated with the organizations and that are financially feasible for both the insurer and the organizations. Further, the broker system may implement techniques described herein to provide services that are not available with conventional systems. In particular, the broker system may identify, based at least partly on exposure metrics of a number of organizations, potential candidate organizations to acquire an insurance policy that provides payouts with respect to losses incurred due to intellectual property adversarial proceedings.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example architecture 100 for entity prioritization and analysis. The architecture 100 may include, for example, one or more client-side devices, also described herein as electronic devices 102 and/or entity devices 102. The architecture 100 also includes a broker system 104 that is remote from, but in communication with, the client-side electronic devices 102. The architecture 100 also includes an insurer system 106 that is remote from, but in communication with, the client-side devices 102 and/or the broker system 104. Additionally, the architecture 100 includes an information database 108 that includes publicly-available information.

The entity devices 102 may include components such as, for example, one or more processors 110, one or more network interfaces 112, and/or memory 114. The memory 114 may include components such as, for example, one or more applications 116 and/or one or more user interfaces 118. As shown in FIG. 1, the entity devices 102 may include, for example, a computing device, a mobile phone, a tablet, a laptop, and/or one or more servers. It should be understood that the examples provided herein are illustrative and should not be considered the exclusive examples of the components of the entity device 102. Additionally, one or more of the components of the entity device 102 may be generally utilized to perform one or more of the actions, operations, and/or steps described herein as being performed by the entity. The components of the memory 114 will be described below by way of example.

The insurer system 106 may include components such as one or more processors 120, one or more network interfaces 122, and/or memory 124. The memory 124 may include one or more components such as one or more applications 126 and/or entity-data database 128. Additionally, one or more of the components of the insurer system 106 may be generally utilized to perform one or more of the actions, operations, and/or steps described herein as being performed by the insurer. The components of the memory 124 will be described below by way of example.

The broker system 104 may include components such as one or more processors 130, one or more network interfaces 132, and/or memory 134. The memory 134 may include one or more components such as one or more predictive models 136, an entity-rating component 138, a prioritization component 140, a recommendation component 142, a cost component 144, a feedback component 146, and/or a jurisdictional component 148. It should be understood that the examples provided herein are illustrative and should not be considered the exclusive examples of the components of the broker system 104. Additionally, one or more of the components of the broker system 104 may be generally utilized to perform one or more of the actions, operations, and/or steps described herein as being performed by the broker. The components of the memory 134 will be described below by way of example.

For example, the predictive models 136 may be configured to generate data such as a frequency value indicating how frequently and/or a likelihood that a given entity will be involved in defending against a claim involving intellectual property. For example, the insurer system 106 may include a database 128 of entity data associated with entities that have acquired or applied for one or more insurance policies from the insurer. Those insurance policies may include, for example, general liability insurance, product liability insurance, etc., as well as IP infringement liability insurance. The information may include, for example, an identifier of a given entity, one or more industries associated with the entity, a revenue associated with the entity, a profit associated with the entity, an indication of intellectual-property litigation history, a number of employees associated with the entity, an indication of the insurance policies held by the entity, and/or a monetary amount paid by the entity to the insurer. In examples, at least a portion of this information may be publicly available and may be obtained from the information database 108. In further examples, at least a portion of this information may be stored with respect to a given entity, such as in association with the entity device 102, and the information may be obtained from entity device 102 associated with the given entity upon receiving authorization to obtain such information from the entity. In examples, the database 128 may be supplemented with additional information about exposure depending at least in part on initial assessment metrics. For example, if an initial recommendation is that premiums for a given insurance policy are high, additional and/or differing information may be received, identified, and/or determined to reduce the premiums and/or to analyze other exposure factors such as analysis of non-litigation conflicts, settlements, and/or defensive measures, for example.

The information described above may be received at the broker system 104 and may be analyzed to determine a joint probability value indicating a likelihood and/or expected monetary amount of loss and/or associated information associated with a given entity. For example, the insurer system 106 may send the entity data to the broker system 106. In other examples, the broker system 106 may receive the entity data from the entity devices 102. The entity-rating component 138 may receive the entity data and may filter, configure, and/or otherwise format the entity data for input into the predictive models 136. The entity-rating component 128 may send the entity data, as formatted, to the predictive models 136 along with, in examples, instructions for generating output. The predictive models 136 may be configured to accept the features and/or feature vectors corresponding to the entity data. The predictive models 136 may utilize the features and/or feature vectors to generate output data associated with the entity. For example, the output data may include a frequency value indicating an anticipated frequency of the entity being involved in defending against a claim involving intellectual property. The output data may also include a severity value indicating a monetary amount and/or a range of monetary amounts of anticipated damage to the entity associated with the claim involving intellectual property. The output data may also include an indication of a most-probable type of intellectual-property claim that may be levied against the entity based at least in part on the industry in which the entity operates and/or the products and/or services offered by the entity. The output data may also include a probability distribution of loss, which may represent a graph showing probabilities that a given loss amount will occur for the entity. The output data may also include one or more confidence values associated with other portions of the output data.

The predictive models 136 may utilize predictive analytic techniques to perform the operations described herein. The predictive analytic techniques may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models 136 describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, such as for example the entity-data database 128 and/or the information database 108, and may be utilized to predict trends and behavior patterns. In examples, the event, otherwise described herein as an outcome, may be an event that will occur in the future, such as whether a given entity will be involved in defending against a claim associated with intellectual property. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis, such as from the entity-data database 128 and/or the information database 108.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models for future events. By so doing, the predictive models 136 may utilize data from the entity-data database 128 and/or the information database, as well as features from other systems as described herein, to predict or otherwise determine an outcome. Outcome prediction may be deterministic such that the outcome is determined to occur or not occur. Additionally, or alternatively, the outcome prediction may be probabilistic such that the outcome is determined to occur to a certain probability and/or confidence. The features described herein may be individual measurable properties or characteristics of the observed outcome. A feature may be numeric and/or may include one or more strings and/or graphs. In examples, the feature may correspond to an explanatory variable, such as when statistical techniques are utilized when generating and/or utilizing predictive models. The features may be utilized as inputs by the predictive models 136 to predict the outcome, as described herein.

Additionally, or alternatively, the entity-rating component 138 may utilize information associated with intellectual property owned by the entity for determining liability probability. For example, a given entity may not own intellectual property assets. In this situation, the entity may be more vulnerable to a claim of intellectual-property infringement because, for example, the entity has not acquired rights to innovation in the industry in which the entity is operating and/or because the entity would not have potential counterclaims for infringement against a would-be plaintiff. In other examples, a given entity may own intellectual property assets, and in these examples, the broker system 104 may receive information indicating the intellectual property associated with the entity and may determine a degree of coverage of the intellectual property with respect to the industry associated with the entity. In examples where the degree of coverage is high, the exposure potential for the entity may be decreased. This information may be utilized as a feature and/or feature vector and input into the predictive models 136 described herein to generate output data. Additionally, the generated recommendation for the entity to acquire the insurance policy may indicate the degree of coverage and/or the intellectual property owned by the entity.

Additionally, the entity-rating component 138, when identifying and/or determining the severity value as described herein, may utilize historical damages information to evaluate a potential damages amount that an entity would likely incur in the event of an adverse legal action involving intellectual property. However, while some damages awards, such as from jury trials, are made public, many intellectual-property claims are settled prior to trial and are confidential in nature. In light of this, the entity-rating component 138 may include a sliding scale of damages that may account for various settlement amounts. For example, for a given industry and/or entity type, settlement amounts may be anticipated to be 80% of damage awards. In other industries and/or for other entity types, settlement amounts may be anticipated to be 10% of damage awards. As such, a percentage of damages awards may be identified on the sliding scale for a given entity based at least in part on the industry in which the entity operates and/or the entity type associated with the entity.

In examples, the entity-rating component 138 may be configured to utilize an entity's loss history in addition to and/or instead of loss exposure metrics to rate an entity. The entity-rating component 138 may utilize the models 136 to perform such a rating. For example, data associated with loss history may be compared with loss exposure data to generate a credibility weighting, which may be based at least in part on a weighted average of the loss history data and the loss exposure data. The credibility value assigned to a given loss history may also vary based at least in part on factors such as how many losses have occurred, revenue, industry in questions, and/or other factors.

The prioritization component 140 may be configured to determine a ranking of entities associated with the insurer system 106. For example, the prioritization component 140 may score some or all of the entity data, otherwise described herein as characteristics, based at least in part on one or more machine learning models and/or utilizing heuristics. By way of example, each score may be on a given scale, such as from −5 to +5, with +5 representing a highest possible score for a given characteristic. It should be understood that "scoring" refers to assigning a characteristic and/or an entity a value or indicator, and other methodologies for assigning values and/or indicators are included in this disclosure. It should be further understood that the scales provided herein are provided by way of illustration, and not as a limitation. Other scales and/or increments also includes in this disclosure.

By way of example, the industry associated with the entity may be scored, the revenue associated with the entity may be scored, the number of intellectual-property infringement lawsuits that the entity has been involved in may be scored, the types of insurance policies held by the entity may be scored, and/or the monetary amount paid to the insurer may be scored. In a given example, an entity associated with innovative technologies, such as a technology sector, computing sector, and/or electronic device sector may be scored highly, such as a +5, while sectors such as food sectors and retail sectors may be scored lower, such as a −5. Additionally, an entity associated with a high revenue may receive a higher score than an entity with comparatively lower revenue. Additionally, an entity involved in, for example, 1-5 lawsuits involving intellectual property may be scored higher than an entity involved in more than 5 lawsuits or no lawsuits involving intellectual property. For example, an entity that has not been involved in a lawsuit with intellectual-property claims may not be inclined to acquire an insurance policy covering such claims, whereas an entity that has been involved in such lawsuits may understand the need for such an insurance policy. Additionally, an entity that holds insurance policies associated with cyber protection and/or product liability may be scored higher than entities without insurance policies or with other types of insurance policies, such as general liability insurance. For example, entities with cyber protection and/or product liability policies may be generally more exposure averse and/or may be more interested in transferring exposure than entities without such policies, which may be a factor in determining a likelihood that an entity with acquire a policy covering intellectual-property claims. Additionally, entities with a higher degree of spending on insurance policies may be scored higher than entities with comparatively less spending.

Some or all of the scores may be weighted by the prioritization component 138 based at least in part on, for example, the industry associated with the entity and/or prior rankings performed by the broker system 104. The scores and/or weighted scores may be aggregated to generate a prioritization value for a given entity. The prioritization value may be analyzed in association with one or more other prioritization values associated with other entities to generate a ranking of the entities. By so doing, the broker system 104 may determine which entities are most likely to acquire an insurance policy insuring against claims involving intellectual property or otherwise most attractive to insurers to insure. By way of example, a first entity may be associated with a generated prioritization value of 4.4, which may indicate that the entity is associated with a technology-centric industry, has a large amount of revenue, has been involved in some intellectual-property lawsuits previously, holds a cyber-security insurance policy, and has a high degree of spend on insurance policies. A second entity may be associated with a generated prioritization value of 0.2, which may indicate that the entity is associated with an industry that is comparatively less technology-centric, the entity has a moderate revenue, the entity has not been involved in an intellectual-property lawsuit, and does not hold other types of insurance policies. In this example, the first entity may be ranked higher or otherwise more favorably than the second entity. It should be understood that when scores and/or entities are compared as described herein, a particular scoring system will determine which score and/or entity is more favorable than other scores and/or entities. For example, when a scoring system indicates that higher values are associated with more favorable scores, a highest score will be considered most favorable. In other scoring systems that indicate lower values are associated with more favorable scores, a lowest score will be considered most favorable.

In other examples, the broker system 104 may utilize the prioritization component 140 to identify entities that are associated with high exposure levels but with otherwise attractive features as potential entities for acquiring insurance policies. For such entities, identification of policy terms, such as premium amounts may be based at least in part on determining the level of exposure associated with the entity.

The recommendation component 142 may be configured to identify, determine, and/or generate recommendations associated with the output of the entity-rating component 138 and/or the prioritization component 140, for example. By way of example, a given recommendation may include the ranking of an entity or group of entities as output by the prioritization component 140. In these examples, the recommendation may include a naming indicator for some or all of the entities as well as, in examples, the prioritization value associated with the entities. The naming indicators may be arranged such that the entity associated with the most favorable prioritization value is listed and/or displayed first. Additionally, the recommendation may be configured such that the naming indicators for the entities are linked or otherwise selectable. For example, the recommendation, when viewed on a display of the insurer system 106, may include selectable links that, when selected, may cause information associated with the selected entity to be displayed via one or more user interfaces of the insurer system 106. The information may include information identified, determined, and/or generated by the predictive models 136 and/or the entity-rating component 138. For example, the information may include a contact associated with the entity, a frequency value and/or likelihood that the entity will be involved in a claim involving intellectual property, the severity value and/or range of values, the event type, and/or the probability distribution of loss. By way of further example, the recommendation may include loss likelihoods and/or severities for entities associated with the same industry in which a given entity operates. By providing industry loss likelihoods and/or severities, a comparison between the industry in general and a given entity may be provided. It should be understood that the recommendation component 142 may be configured to generate recommendations that include any information associated with insurance policies, the broker, the insurer, and/or the insured, and need not include a ranking as discussed herein. For example, a given recommendation may include recommended terms of an insurance policy and/or details associated with one or more of the analyses and/or processes described herein.

In examples, the insurer may utilize the recommendation to determine which entity to insure and on what terms, as well as to shape a desired portfolio of issued policies, for example. The broker may utilize the recommendation to build a broking-target pipeline, for example. The entity may utilize the recommendation to obtain a quick assessment of relative exposure and insurance availability, for example. The recommendation may enable the broker to provide a quick "auto-indication" of likely insurance availability and pricing to the entity, such as without having to consult with insurers for underwriting.

Additionally, or alternatively, the broker system 104 may be configured to determine one or more terms of the insurance policy, such as a cost of holding the insurance policy by a given entity. For example, the cost component 144 may receive a determined loss-probability distribution from the entity-rating component 138. Additionally, the cost component 144 may determine certain terms of a potential insurance policy that would be desired and/or reasonable in light of the loss-probability distribution, such as, for example, a policy limit, a retention amount, and/or a copayment amount and/or percentage. Based at least in part on the determined terms, the loss-probability distribution, and/or one or more other factors, such as the output data as described above, the cost component 144 may determine an estimated and/or recommended cost to the insured to hold the insurance policy. The recommended cost may be a total cost and/or an amount of a premium amount to be charged to the entity. For example, given a certain policy limit, retention amount, and/or co-pay amount, the cost component 144 may determine a percentage of the policy limit that the insurer would need to realize as payment to make the insurance policy worth issuing. This amount may also be influenced by the loss-distribution indicating whether the entity has a high or low exposure probability. Tolerance levels may be set by the insurer to indicate whether probabilities of more or less exposure will be tolerated when determining terms of the insurance policy. The recommendation component 142 may be configured to include the one or more terms, including the cost recommendation, in the recommendations described herein.

The cost component 144 may also be configured to provide cost estimates for various types of intellectual-property claims. For example, the predictive models 136 described herein may be configured to assess exposure and/or severity with respect to a given intellectual property type, such as patents and related patent infringement. This may be useful where patent infringement represents a dominant exposure type for a given entity and/or industry and is the risk that both insured and insurer are most interested in addressing. Other types of intellectual-property claims, such as trademark infringement and/or dilution, copyright infringement, and/or trade secret misappropriation may be considered in addition to the dominant patent infringement exposure likelihood and severity. In these examples, the predictive models 136 may be configured for evaluating exposure and cost estimate for each type of intellectual-property claim individually. In other examples, the predictive models 136 and/or one or more heuristic techniques may be utilized to determine a percentage and/or amount to add to the cost determination for an insurance policy covering multiple types of intellectual-property claims. The percentage and/or amount may be based on data associated with given intellectual-property claims for entities associated with a given industry.

Additionally, or alternatively, the jurisdictional component 148 may be configured to analyze the products and/or services offered by a given entity to determine countries in which the entity makes, uses, sells, or offers such products and/or services for sale or otherwise conducts acts that might result in intellectual-property related liability. Other factors such as research and development activities in a given country may be analyzed to determine exposure in such a country. Based at least in part on this analysis, the jurisdictional component 148 may identify one or more countries where a claim for intellectual-property infringement is likely to be asserted against the entity. The jurisdictional component 148 may also determine, utilizing a predictive model 136, a weighting value associated with litigation in a given country. For example, a reference country, such as the United States, may be selected, and other countries may be assigned or associated with a discount factor indicating an increase or decrease in litigation costs associated with litigating an intellectual-property infringement lawsuit in those countries. For example, a discount factor of 0.86 may be applied to lawsuits in Germany. The discount factor may be determined based at least in part on publicly-available or otherwise obtainable information regarding past infringement lawsuits and the respective litigation costs and damage awards. This information may be utilized to generate features and/or feature vectors for input into a predictive model 136. The predictive model 136 may generate the discount factor for a given country and for, in examples, a given industry, damage-amount range, entity size, etc. The discount factor may be applied to the severity value associated with potential damages for the country at issue. Additionally, the discount factor may be applied to the frequency value associated with potential damages for the country at issue.

Additionally, or alternatively, the feedback component 146 may be configured to receive, from at least one of the insurer system 106, broker system 104, or the entity system 102, feedback data indicating that a given entity acquired an insurance policy. For example, the recommendation described above may be sent to the insurer system 106 and agents of the insurer may contact the entities listed in the ranking of entities. Some of the entities may acquire the requested insurance policy, some may not. Information indicating which entities acquired the insurance policy, and which did not, may be utilized to train the predictive models 136 and/or scoring techniques such that subsequent modeling and/or techniques may be more accurate.

Additionally, in examples, one or more wizards may be enabled and may present options associated with the processes and actions described above, such as with respect to the recommendation, for example. The wizards as described herein may be a set of dialog boxes and/or input fields configured to be displayed, such as via the user interface 118 of the entity device 102, broker system 104, and/or the insurer system 106.

As shown in FIG. 1, several of the components of the broker system 104 and/or the insurer system 106 and the associated functionality of those components as described herein may be performed by one or more of the other systems and/or by the entity device 102. Additionally, or alternatively, some or all of the components and/or functionalities associated with the entity device 102 may be performed, at least in part, by the broker system 104 and/or the insurer system 106.

It should be noted that the exchange of data and/or information as described herein may be performed only in situations where a user has provided consent for the exchange of such information. For example, a user may be provided with the opportunity to opt in and/or opt out of data exchanges between devices and/or with the systems and/or for performance of the functionalities described herein. Additionally, when one of the devices is associated with a first user account and another of the devices is associated with a second user account, user consent may be obtained before performing some, any, or all of the operations and/or processes described herein.

Additionally, while entity data has been described herein as being received from an insurer system 106, it should be understood that the entity data may be received from the broking system 104, multiple insurer systems 106 and/or from publicly-available databases such as the information database 108 and/or from entity devices 102.

It should be understood that anywhere in this disclosure where the term "digital property" and/or "trade secret" is used, it should be noted to include not only trade secrets, but any document and/or data and/or information including confidential information, know-how, and other information, and not necessarily documents, data, and/or information meeting a legal definition of the term "trade secret."

As used herein, a processor, such as processor(s) 110, 120, and/or 130, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110, 120, and/or 130 may include a graphics processing unit (GPU), a microprocessor, a digital signal processor or other processing units or components known in the art. Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110, 120, and/or 130 may possess its own local memory, which also may store program components, program data, and/or one or more operating systems.

The memory 114, 124, and/or 134 may include volatile and nonvolatile memory, removable and non-removable media implemented in any method or technology for storage of information, such as computer-readable instructions, data structures, program component, or other data. Such memory 114, 124, and/or 134 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 118 and/or 130 may be implemented as computer-readable storage media ("CRSM"), which may be any available physical media accessible by the processor(s) 110, 120, and/or 130 to execute instructions stored on the memory 114, 124, and/or 134. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114, 124, and/or 134, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 112, 122, and/or 132 may enable messages between the components and/or devices shown in architecture 100 and/or with one or more other remote systems, as well as other networked devices. Such network interface(s) 112, 122, and/or 132 may include one or more network interface controllers (NICs) or other types of transceiver devices to send and receive messages over a network 150.

For instance, each of the network interface(s) 112, 122, and/or 132 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112, 122, and/or 132 may include a wide area network (WAN) component to enable message over a wide area network.

Figure 2:
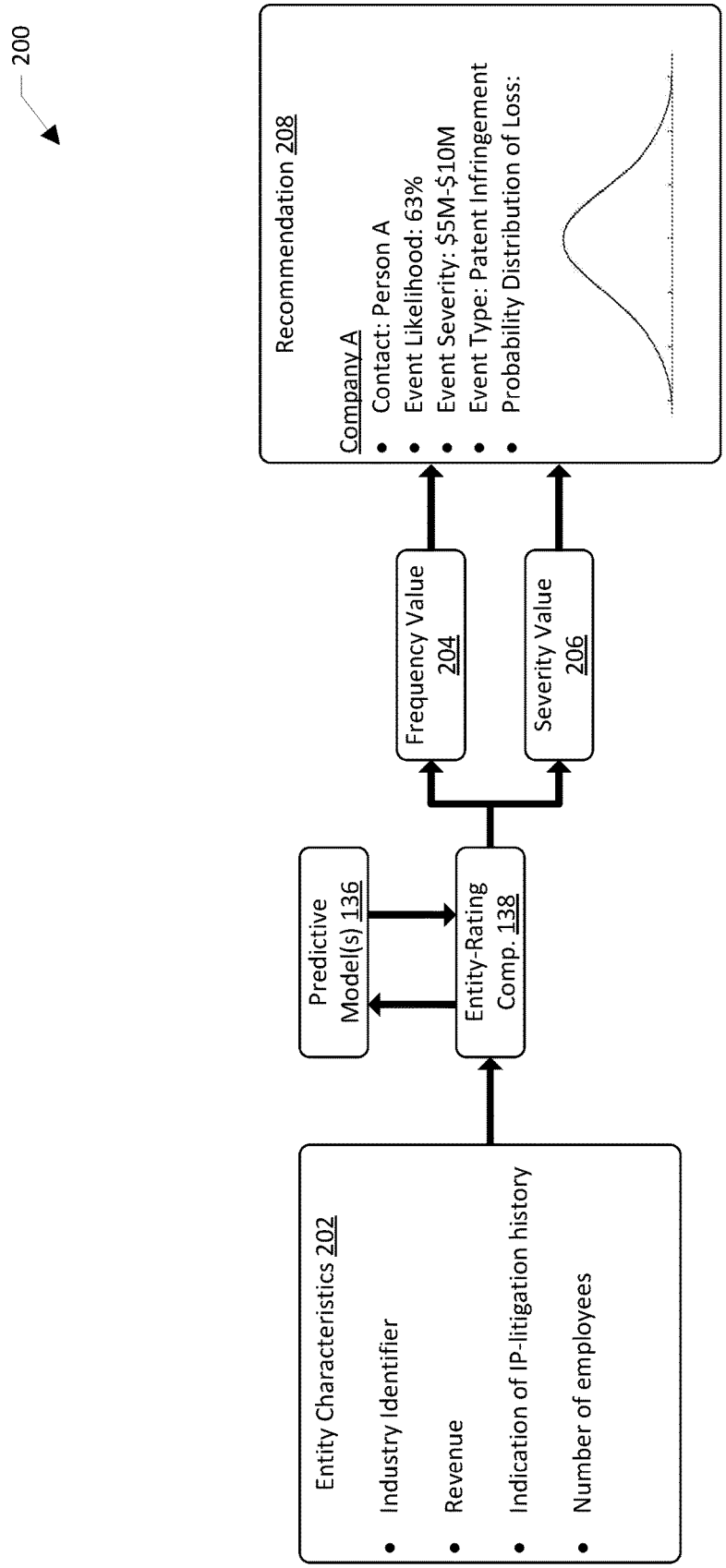
FIG. 2 illustrates a conceptual diagram of information and processes for entity analysis to generate a recommendation for issuing an insurance policy covering intellectual-property claims.

FIG. 2 illustrates a conceptual diagram 200 of information and processes for entity analysis to generate a recommendation for issuing an insurance policy covering intellectual-property claims.

For example, entity data may be received from one or more sources, such as from insurer systems, entity systems and/or devices, and/or publicly-available databases. For example, the insurer system may include a database of entity data associated with entities that have acquired one or more insurance policies from the insurer. Those insurance policies may include, for example, general liability insurance, product liability insurance, etc. The information may include, in the example shown in FIG. 2, an identifier of a given entity, one or more industries associated with the entity, a revenue associated with the entity, a profit associated with the entity, an indication of intellectual-property litigation history, a number of employees associated with the entity, an indication of the insurance policies held by the entity, and/or a monetary amount paid by the entity to the insurer and/or to multiple insurers that have issued policies to the entity. This information may be described herein as entity characteristics 202.

The entity characteristics 202 described above may be received at a broker system and may be analyzed to determine a joint probability value indicating a likelihood and/or expected monetary amount of loss and/or associated information associated with a given entity. For example, the insurer system may send the entity characteristics 202 to the broker system. In other examples, entity devices may send the entity characteristics 202 to the broker system. An entity-rating component 138 may receive the entity data and may filter, configure, and/or otherwise format the entity data for input into predictive models 136. The entity-rating component 138 may send the entity data, as formatted, to the predictive models 136 along with, in examples, instructions for generating output. The entity-rating component 138 may be configured to generate features and/or feature vectors utilizing the entity data for input into the predictive models 136. The predictive models 136 may be configured to accept the features and/or feature vectors corresponding to the entity data. The predictive models 136 may utilize the features and/or feature vectors to generate output data associated with the entity. For example, the output data may include a frequency value 204 indicating an anticipated frequency of the entity being involved in defending against a claim involving intellectual property. The output data may also include a severity value 206 indicating a monetary amount and/or a range of monetary amounts of anticipated damage to the entity associated with the claim involving intellectual property. The output data may also include an indication of a most-probable type of intellectual-property claim that may be levied against the entity based at least in part on the industry in which the entity operates and/or the products and/or services offered by the entity. The output data may also include a probability distribution of loss, which may represent a graph showing probabilities that a given loss amount will occur for the entity. The output data may also include one or more confidence values associated with other portions of the output data.

Additionally, or alternatively, the entity-rating component 138 may utilize information associated with intellectual property owned by the entity for determining liability probability. For example, a given entity may not own intellectual property assets. In this situation, the entity may be more vulnerable to a claim of intellectual-property infringement because, for example, the entity has not acquired rights to innovation in the industry in which the entity is operating and/or because the entity would not have potential counterclaims for infringement against a would-be plaintiff. In other examples, a given entity may own intellectual property assets, and in these examples, the broker system may receive information indicating the intellectual property associated with the entity and may determine a degree of coverage of the intellectual property with respect to the industry associated with the entity. In examples where the degree of coverage is high, the exposure potential for the entity may be decreased. This information may be utilized as a feature and/or feature vector and input into the predictive models 136 described herein to generate output data. Additionally, the generated recommendation for the entity to acquire the insurance policy may indicate the degree of coverage and/or the intellectual property owned by the entity.

Additionally, the entity-rating component 138, when identifying and/or determining the severity value as described herein, may utilize historical damages information to evaluate a potential damages amount that an entity would likely incur in the event of an adverse legal action involving intellectual property. However, while some damages awards, such as from jury trials, are made public, many intellectual-property claims are settled prior to trial and are confidential in nature. In light of this, the entity-rating component 138 may include a sliding scale of damages that may account for various settlement amounts. For example, for a given industry and/or entity type, settlement amounts may be anticipated to be 80% of damage awards. In other industries and/or for other entity types, settlement amounts may be anticipated to be 10% of damage awards. As such, a percentage of damages awards may be identified on the sliding scale for a given entity based at least in part on the industry in which the entity operates and/or the entity type associated with the entity. The given industry and/or entity type associated with the entity may be based at least in part on the entity's historical experience and/or involvement as part of a post-initial-recommendation feedback analysis configured to refine exposure assessment and policy terms. For example, after an initial recommendation is provided, feedback data may be received and may be analyzed to identify and/or determine the industry and/or entity type associated with the entity.

The frequency value 204, the severity value 206, and/or other information output by the entity-rating component 138 may be utilized to identify, determine, and/or generate a recommendation 208 for insurance coverage for a single entity and/or group of entities. For example, a recommendation component may be configured to identify, determine, and/or generate recommendations 208 associated with the output of the entity-rating component 138. By way of example, a given recommendation 208 may include a contact associated with the entity, a frequency value and/or likelihood that the entity will be involved in a claim involving intellectual property, the severity value and/or range of values, the event type, and/or the probability distribution of loss. Using FIG. 2 as an example, the recommendation 208 may indicate that Person A is a contact for Company A, Company A has a 63% likelihood of an adverse event occurring with a $5 million to $10 million event-severity range, and where the event is likely to be a claim for patent infringement. By way of further example, the recommendation 208 may include loss likelihoods and/or severities for entities associated with the same industry in which a given entity operates. By providing industry loss likelihoods and/ or severities, a comparison between the industry in general and a given entity may be provided.

Figure 3:
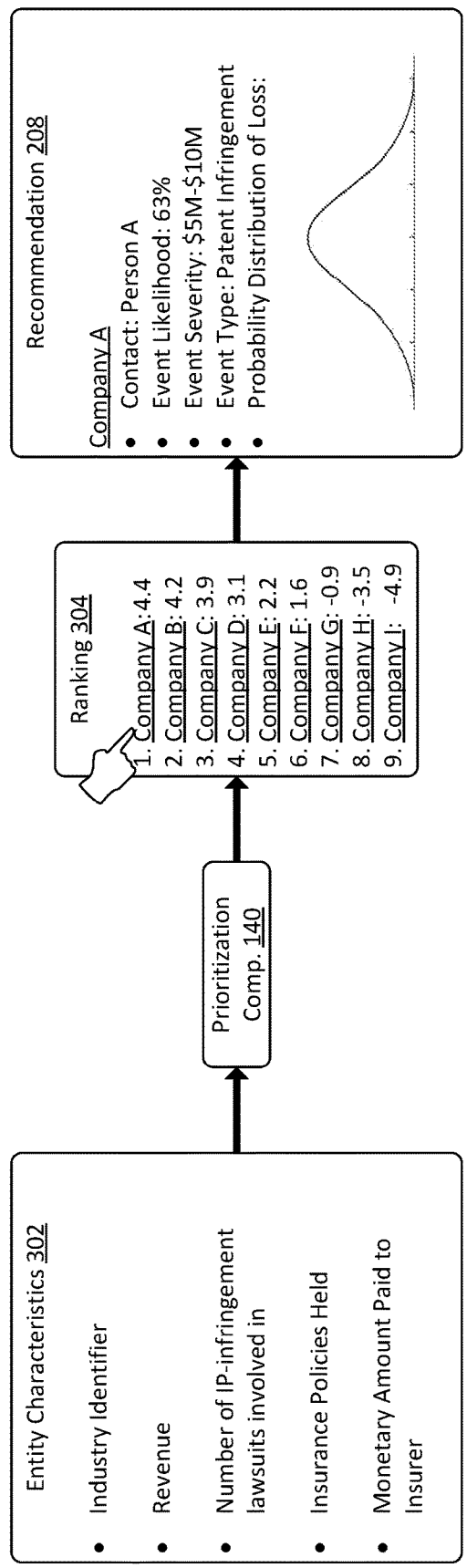
FIG. 3 illustrates a conceptual diagram of information and processes for entity prioritization.

FIG. 3 illustrates a conceptual diagram 300 of information and processes for entity prioritization. For example, entity data may be received from one or more sources, such as from insurer systems, entity systems and/or devices, and/or publicly-available databases. For example, the insurer system may include a database of entity data associated with entities that have acquired one or more insurance policies from the insurer. Those insurance policies may include, for example, general liability insurance, product liability insurance, etc. The information may include, in the example shown in FIG. 3, an identifier of a given entity, one or more industries associated with the entity, a revenue associated with the entity, a number of lawsuits the entity has been involved in with a claim involving intellectual property, an indication of the insurance policies held by the entity, and/or a monetary amount paid by the entity to the insurer. This information may be described herein as entity characteristics 302.

The entity characteristics 302 described above may be received at a broker system and may be analyzed to determine prioritization values associated with various entities. For example, a prioritization component 140 may be configured to determine a ranking of entities associated with the insurer system. For example, the prioritization component may score some or all of the entity characteristics 302 based at least in part on one or more machine learning models and/or utilizing heuristics. By way of example, each score may be on a given scale, such as from −5 to +5, with +5 representing a highest possible score for a given characteristic 302. It should be understood that "scoring" refers to assigning a characteristic 302 and/or an entity a value or indicator, and other methodologies for assigning values and/or indicators is included in this disclosure. It should be further understood that the scales provided herein are provided by way of illustration, and not as a limitation. Other scales and/or increments also includes in this disclosure.

By way of example, the industry associated with the entity may be scored, the revenue associated with the entity may be scored, the number of intellectual-property infringement lawsuits that the entity has been involved in may be scored, the types of insurance policies held by the entity may be scored, and/or the monetary amount paid to the insurer may be scored. In a given example, an entity associated with innovative technologies, such as a technology sector, computing sector, and/or electronic device sector may be scored highly, such as a +5, while sectors such as food sectors and retail sectors may be scored lower, such as a −5. Additionally, an entity associated with a high revenue may receive a higher score than an entity with comparatively lower revenue. Additionally, an entity involved in, for example, 1-5 lawsuits involving intellectual property may be scored higher than an entity involved in more than 5 lawsuits or no lawsuits involving intellectual property. Additionally, an entity that holds insurance policies associated with cyber protection and/or product liability may be scored higher than entities without insurance policies or with other types of insurance policies, such as general liability insurance. Additionally, entities with a higher degree of spending on insurance policies may be scored higher than entities with comparatively less spending.

Some or all of the scores may be weighted by the prioritization component 140 based at least in part on, for example, the industry associated with the entity and/or prior rankings performed by the broker system. The scores and/or weighted scores may be aggregated to generate a prioritization value for a given entity. The prioritization value may be analyzed in association with one or more other prioritization values associated with other entities to generate a ranking 304 of the entities. By so doing, the broker system may determine which entities are most likely to acquire an insurance policy insuring against claims involving intellectual property. Using FIG. 3 as an example, Company A may be associated with a generated prioritization value of 4.4, which may indicate that the entity is associated with a technology-centric industry, has a large amount of revenue, has been involved in some intellectual-property lawsuits previous, holds a cyber-security insurance policy, and has a high degree of spend on insurance policies. Company F may be associated with a generated prioritization value of 1.6, which may indicate that the entity is associated with an industry that is comparatively less technology-centric, the entity has a moderate revenue, the entity has not been involved in an intellectual-property lawsuit, and does not hold other types of insurance policies. In this example, Company A may be ranked higher or otherwise more favorably than Company F. It should be understood that when scores and/or entities are compared as described herein, a particular scoring system will determine which score and/or entity is more favorable than other scores and/or entities. For example, when a scoring system indicates that higher values are associated with more favorable scores, a highest score will be considered most favorable. In other scoring systems that indicate lower values are associated with more favorable scores, a lowest score will be considered most favorable.

The naming indicators for the entities may be arranged such that the entity associated with the most favorable prioritization value is listed and/or displayed first. Additionally, the data representing the ranking 304 may be configured such that the naming indicators for the entities are linked or otherwise selectable. For example, the ranking 304, when viewed on a display of the insurer system, may include selectable links that, when selected, may cause information associated with the selected entity to be displayed via one or more user interfaces of the insurer system. As shown in FIG. 3, a user may select a given naming indicator, here Company A. Upon selection, the recommendation 208 may be displayed. The recommendation 208 may include the same or similar information as described with respect to FIG. 2.

Figure 4:
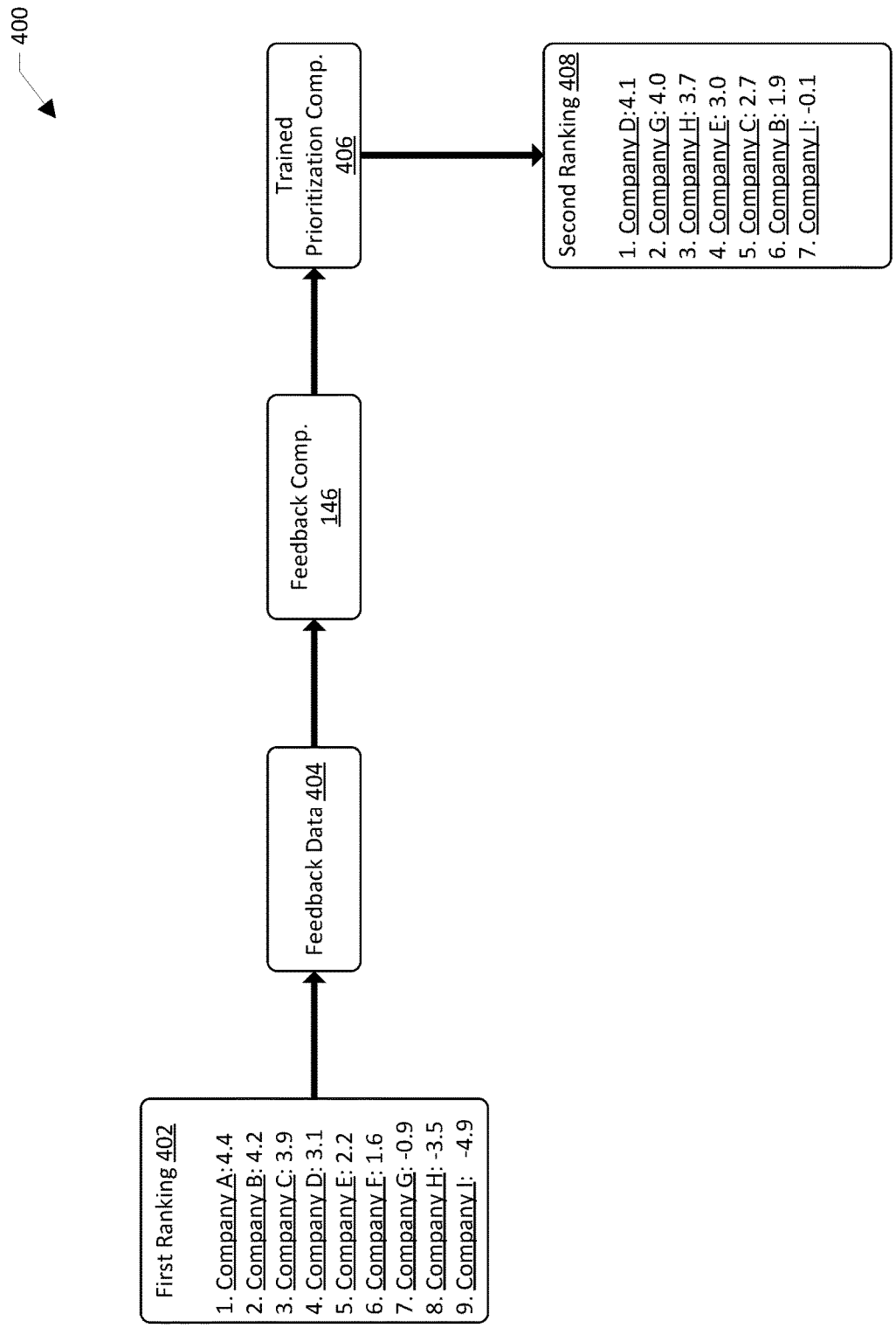
FIG. 4 illustrates a conceptual diagram of information and processes for utilizing feedback data to train one or more models associated with entity prioritization and/or analysis.

FIG. 4 illustrates a conceptual diagram 400 of information and processes for utilizing feedback data to train one or more models associated with entity prioritization and/or analysis. For example, a first ranking 402 may be generated by the prioritization component of a broker system as described more fully above with respect to FIG. 3. The insurer may utilize the first ranking 402 to determine which entities to contact and how to contact them. The insurer, or another user, may contact the entities listed in the first ranking 402 and one or more of those entities may desire to acquire an insurance policy insuring against claims involving intellectual property. Other entities may decide not to pursue such insurance policies. Additionally, the terms of the various policies that are issued to the one or more entities from the first ranking 402 may be identified and/or determined.

Feedback data 404 may be generated by the insurer system that indicates which entities acquired the aforementioned insurance policies and/or the terms associated with those policies. Additionally, information gathered from and/or or about the entities during due diligence processes for issuing the insurance policies may also be retrieved and utilized to generate the feedback data 404. The feedback data 404 may be sent from the insurer system and/or from an entity system, as authorized, to the broker system. A feedback component 146 may be configured to receive, from at least one of the insurer system or the entity system, the feedback data 404. The feedback component 146 may utilize the feedback data 404 to generate one or more features and/or attributes that may be utilized to train one or more of the components of the broker system, such as the predictive models, the entity-rating component, the prioritization component, etc. In the example of FIG. 4, the feedback component 146 may be utilized to generate features and/or attributes from the feedback data 404 to generate a trained prioritization component 406. For example, the features and/or attributes may be utilized to adjust the scoring techniques and/or the factors considered in the scoring techniques and/or the weighting of the scores described above with respect to the prioritization component.

As shown in FIG. 4, the trained prioritization component 406 may be utilized to generate a second ranking 408 from entity data, which may be the same or differing entity data utilized to generate the first ranking 402. As can be seen in FIG. 4, the trained prioritization component 406 may generate a second ranking 408 where the prioritization of the various entities differs from the first ranking 402.

While the prioritization component is described herein as being trained utilizing the feedback component 146, it should be understood that other components may be trained utilizing the feedback data 404. For example, the predictive models may be trained to more accurately determine frequency values, severity values, and/or loss probabilities. The cost component may also be trained to more accurately determine policy costs, discount factors, and/or percentages and/or amounts based on intellectual property type.

FIGS. 5-8 illustrates processes for entity prioritization and analysis. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4, although the processes may be implemented in a wide variety of other environments, architectures and systems.

Figure 5:
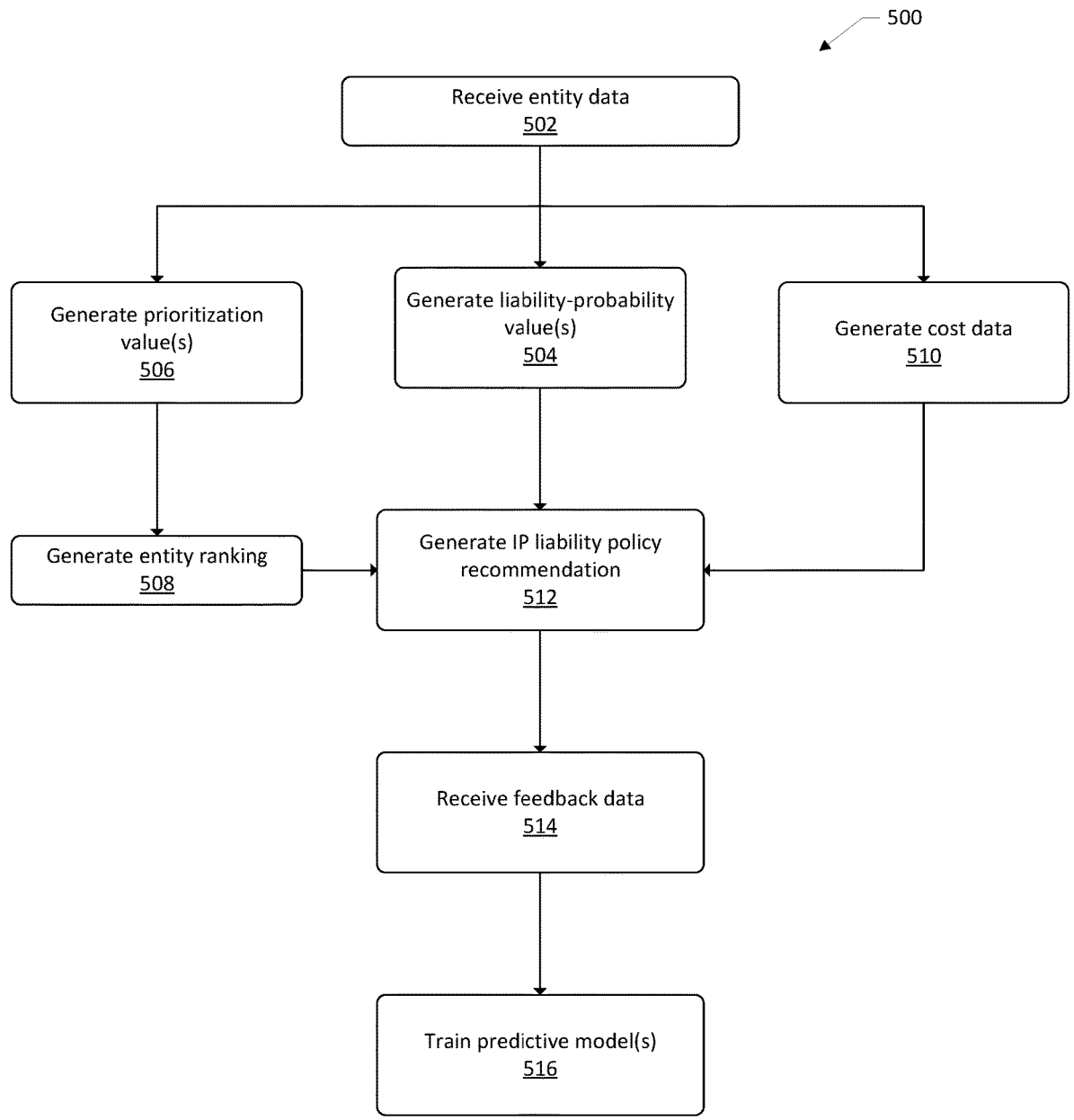
FIG. 5 illustrates a flow diagram of an example process for entity prioritization and analysis.

FIG. 5 illustrates a flow diagram of an example process 500 for entity prioritization and analysis. The order in which the operations or steps are described is not intended to be construed as a limitation, and any number of the described operations may be combined in any order and/or in parallel to implement process 500.

At block 502, the process 500 may include receiving entity data. For example, entity data may be received from one or more sources, such as from insurer systems, entity systems and/or devices, and/or publicly-available databases. For example, the insurer system may include a database of entity data associated with entities that have acquired one or more insurance policies from the insurer. Those insurance policies may include, for example, general liability insurance, product liability insurance, etc. The information may include, for example, an identifier of a given entity, one or more industries associated with the entity, a revenue associated with the entity, a profit associated with the entity, an indication of intellectual-property litigation history, a number of employees associated with the entity, an indication of the insurance policies held by the entity, and/or a monetary amount paid by the entity to the insurer.

At block 504, the process 500 may include generating one or more joint probability values indicating a likelihood and/or expected monetary amount of loss. For example, an entity-rating component may receive the entity data, which may be filtered, configured, and/or otherwise formatted for input into predictive models. The entity-rating component may send the entity data, as formatted, to the predictive models along with, in examples, instructions for generating output. The entity-rating component may be configured to generate features and/or feature vectors utilizing the entity data for input into the predictive models. The predictive models may be configured to accept the features and/or feature vectors corresponding to the entity data. The predictive models may utilize the features and/or feature vectors to generate output data associated with the entity. For example, the output data may include a frequency value indicating an anticipated frequency of the entity being involved in defending against a claim involving intellectual property. The output data may also include a severity value indicating a monetary amount and/or a range of monetary amounts of anticipated damage to the entity associated with the claim involving intellectual property. The output data may also include an indication of a most-probable type of intellectual-property claim that may be levied against the entity based at least in part on the industry in which the entity operates and/or the products and/or services offered by the entity. The output data may also include a probability distribution of loss, which may represent a graph showing probabilities that a given loss amount will occur for the entity. The output data may also include one or more confidence values associated with other portions of the output data.

Additionally, or alternatively, the entity-rating component may utilize information associated with intellectual property owned by the entity for determining liability probability. For example, a given entity may not own intellectual property assets. In this situation, the entity may be more vulnerable to a claim of intellectual-property infringement because, for example, the entity has not acquired rights to innovation in the industry in which the entity is operating and/or because the entity would not have potential counterclaims for infringement against a would-be plaintiff. In other examples, a given entity may own intellectual property assets, and in these examples, the broker system may receive information indicating the intellectual property associated with the entity and may determine a degree of coverage of the intellectual property with respect to the industry associated with the entity. In examples where the degree of coverage is high, the exposure potential for the entity may be decreased. This information may be utilized as a feature and/or feature vector and input into the predictive models 136 described herein to generate output data. Additionally, the generated recommendation for the entity to acquire the insurance policy may indicate the degree of coverage and/or the intellectual property owned by the entity. The joint probability value may be based at least in part on the output of the entity-rating component, such as the frequency value and/or the severity value.

Additionally, the entity-rating component, when identifying and/or determining the severity value as described herein, may utilize historical damages information to evaluate a potential damages amount that an entity would likely incur in the event of an adverse legal action involving intellectual property. However, while some damages awards, such as from jury trials, are made public, many intellectual-property claims are settled prior to trial and are confidential in nature. In light of this, the entity-rating component may include a sliding scale of damages that may account for various settlement amounts. For example, for a given industry and/or entity type, settlement amounts may be anticipated to be 80% of damage awards. In other industries and/or for other entity types, settlement amounts may be anticipated to be 10% of damage awards. As such, a percentage of damages awards may be identified on the sliding scale for a given entity based at least in part on the industry in which the entity operates and/or the entity type associated with the entity.

At block 506, the process 500 may include generating one or more prioritization values. For example, a prioritization component may be configured to determine a ranking of entities associated with the insurer system. For example, the prioritization component may score some or all of the entity characteristics based at least in part on one or more machine learning models and/or utilizing heuristics. By way of example, each score may be on a given scale, such as from −5 to +5, with +5 representing a highest possible score for a given characteristic. It should be understood that "scoring" refers to assigning a characteristic and/or an entity a value or indicator, and other methodologies for assigning values and/or indicators is included in this disclosure. It should be further understood that the scales provided herein are provided by way of illustration, and not as a limitation. Other scales and/or increments also includes in this disclosure.

By way of example, the industry associated with the entity may be scored, the revenue associated with the entity may be scored, the number of intellectual-property infringement lawsuits that the entity has been involved in may be scored, the types of insurance policies held by the entity may be scored, and/or the monetary amount paid to the insurer may be scored. In a given example, an entity associated with innovative technologies, such as a technology sector, computing sector, and/or electronic device sector may be scored highly, such as a +5, while sectors such as food sectors and retail sectors may be scored lower, such as a −5. Additionally, an entity associated with a high revenue may receive a higher score than an entity with comparatively lower revenue. Additionally, an entity involved in, for example, 1-5 lawsuits involving intellectual property may be scored higher than an entity involved in more than 5 lawsuits or no lawsuits involving intellectual property. Additionally, an entity that holds insurance policies associated with cyber protection and/or product liability may be scored higher than entities without insurance policies or with other types of insurance policies, such as general liability insurance. Additionally, entities with a higher degree of spending on insurance policies may be scored higher than entities with comparatively less spending.

At block 508, the process 500 may include generating an entity ranking. For example, some or all of the scores may be weighted by the prioritization component based at least in part on, for example, the industry associated with the entity and/or prior rankings performed by the broker system. The scores and/or weighted scores may be aggregated to generate a prioritization value for a given entity. The prioritization value may be analyzed in association with one or more other prioritization values associated with other entities to generate the ranking of the entities. By so doing, the broker system may determine which entities are most likely to acquire an insurance policy insuring against claims involving intellectual property. It should be understood that when scores and/or entities are compared as described herein, a particular scoring system will determine which score and/or entity is more favorable than other scores and/or entities. For example, when a scoring system indicates that higher values are associated with more favorable scores, a highest score will be considered most favorable. In other scoring systems that indicate lower values are associated with more favorable scores, a lowest score will be considered most favorable.

At block 510, the process 500 may include generating cost data. For example, the cost component may receive a determined loss-probability distribution from the entity-rating component. Additionally, the cost component may determine certain terms of a potential insurance policy that would be desired and/or reasonable in light of the loss-probability distribution, such as, for example, a policy limit, a retention amount, and/or a copayment amount and/or percentage. Based at least in part on the determined terms, the loss-probability distribution, and/or one or more other factors, such as the output data as described above, the cost component may determine an estimated and/or recommended cost to the insured to hold the insurance policy. The recommended cost may be a total cost and/or an amount of a premium amount to be charged to the entity. For example, given a certain policy limit, retention amount, and/or co-pay amount, the cost component may determine a percentage of the policy limit that the insurer would need to realize as payment to make the insurance policy worth issuing. This amount may also be influenced by the loss-distribution indicating whether the entity has a high or low exposure probability. Tolerance levels may be set by the insurer to indicate whether more or less exposure probabilities will be tolerated when determining terms of the insurance policy.

The cost component may also be configured to provide cost estimates for various types of intellectual-property claims. For example, the predictive models described herein may be configured to assess exposure and/or severity with respect to a given intellectual property type, such as patents and related patent infringement. This may be due to patent infringement representing a dominant exposure type for a given entity and/or industry. In these examples, other types of intellectual-property claims, such as trademark infringement and/or dilution, copyright infringement, and/or trade secret misappropriation may be considered in addition to the dominant patent infringement exposure likelihood and severity. In these examples, the predictive models may be configured for evaluating exposure for the other types of intellectual-property claims. In other examples, the predictive models and/or one or more heuristic techniques may be utilized to determine a percentage and/or amount to add to the cost determination for the insurance policy for adding coverage for the other types of intellectual-property claims. The percentage and/or amount may be based on data associated with given intellectual-property claims for entities associated with a given industry.

At block 512, the process 500 may include generating an intellectual-property liability policy recommendation. For example, a recommendation component may be configured to identify, determine, and/or generate recommendations associated with the output of the entity-rating component and/or the prioritization component and/or the cost component, for example. By way of example, a given recommendation may include the ranking of entities as output by the prioritization component. In these examples, the recommendation may include a naming indicator for some or all of the entities as well as, in examples, the prioritization value associated with the entities. The naming indicators may be arranged such that the entity associated with the most favorable prioritization value is listed and/or displayed first. Additionally, the recommendation may be configured such that the naming indicators for the entities are linked or otherwise selectable. For example, the recommendation, when viewed on a display of the insurer system, may include selectable links that, when selected, may cause information associated with the selected entity to be displayed via one or more user interfaces of the insurer system. The information may include information identified, determined, and/or generated by the predictive models and/or the entity-rating component. For example, the information may include a contact associated with the entity, a frequency value and/or likelihood that the entity will be involved in a claim involving intellectual property, the severity value and/or range of values, the event type, and/or the probability distribution of loss. By way of further example, the recommendation may include loss likelihoods and/or severities for entities associated with the same industry in which a given entity operates. By providing industry loss likelihoods and/or severities, a comparison between the industry in general and a given entity may be provided.

At block 514, the process 500 may include receiving feedback data. For example, a first ranking may be generated by the prioritization component of a broker system. The insurer may utilize the first ranking to determine which entities to contact and how to contact them. The insurer, or another user, may contact the entities listed in the first ranking and one or more of those entities may desire to acquire an insurance policy insuring against claims involving intellectual property. Other entities may decide not to pursue such insurance policies. Additionally, the terms of the various policies that are issued to the one or more entities from the first ranking may be identified and/or determined.

Feedback data may be generated by the insurer system that indicates which entities acquired the aforementioned insurance policies and/or the terms associated with those policies. Additionally, information gathered from and/or about the entities during due diligence processes for issuing the insurance policies may also be retrieved and utilized to generate the feedback data. The feedback data may be sent from the insurer system and/or from an entity system, as authorized, to the broker system.

At block 516, the process 500 may include training one or more predictive models based at least in part on the feedback data. For example, a feedback component may be configured to receive, from at least one of the insurer system or the entity system, the feedback data. The feedback component may utilize the feedback data to generate one or more features and/or attributes that may be utilized to train one or more of the components of the broker system, such as the predictive models, the entity-rating component, the prioritization component, etc. The feedback component may be utilized to generate features and/or attributes from the feedback data to generate a trained prioritization component. For example, the features and/or attributes may be utilized to adjust the scoring techniques and/or the factors considered in the scoring techniques and/or the weighting of the scores described above with respect to the prioritization component. The trained prioritization component may be utilized to generate subsequent rankings from entity data, which may be the same or differing entity data utilized to generate the first ranking. Additionally, or alternatively, other components may be trained utilizing the feedback data. For example, the predictive models may be trained to more accurately determine frequency values, severity values, and/or loss probabilities. The cost component may also be trained to more accurately determine policy costs, discount factors, and/or intellectual-property type percentages and/or amounts.

Figure 6:
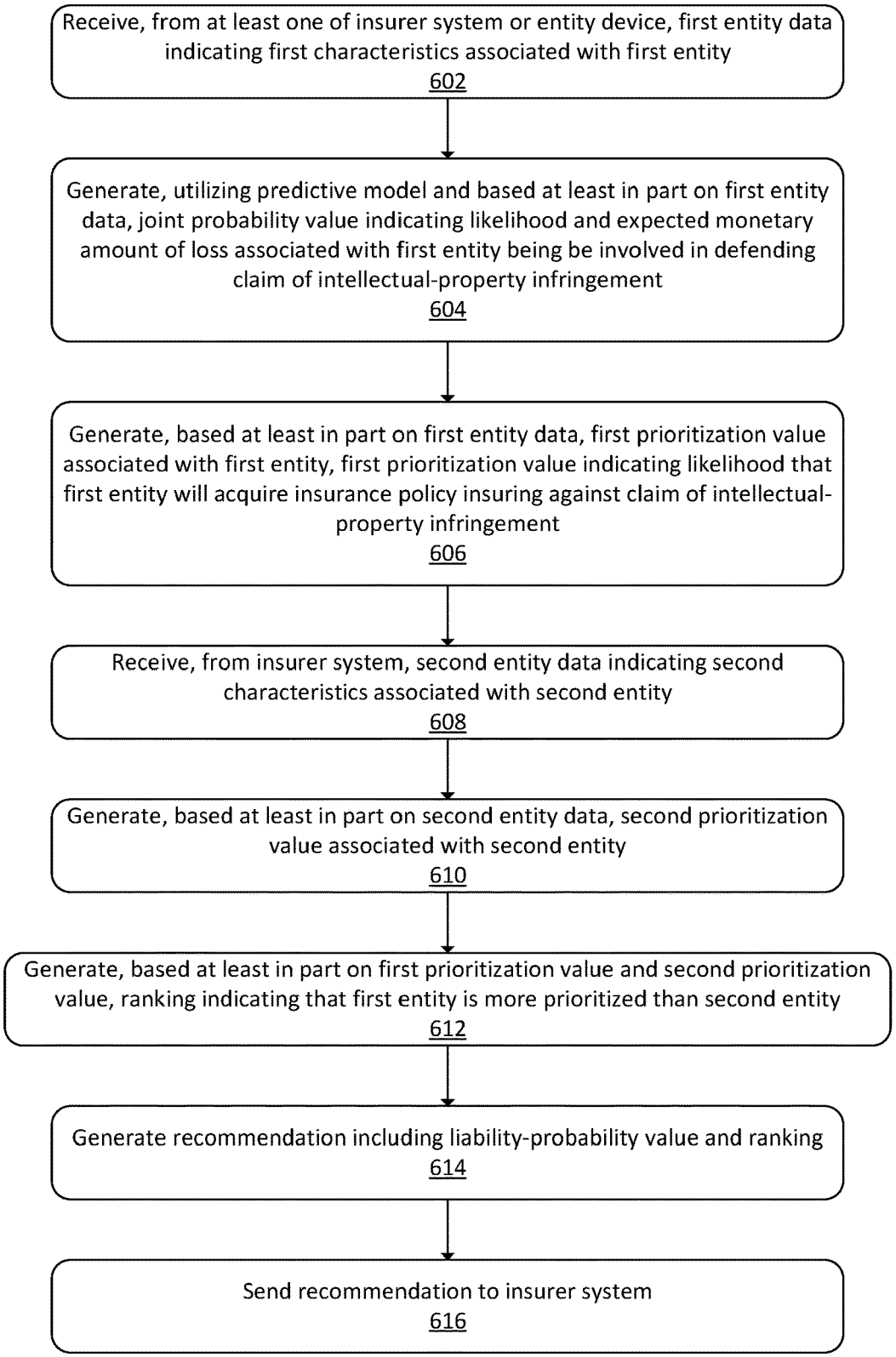
FIG. 6 illustrates a flow diagram of another example process for entity prioritization and analysis.

FIG. 6 illustrates a flow diagram of another example process for entity prioritization and analysis. The order in which the operations or steps are described is not intended to be construed as a limitation, and any number of the described operations may be combined in any order and/or in parallel to implement process 600.

At block 602, the process 600 may include receiving, from at least one of an insurer system, an entity device, and/or from a first entity associated with the entity device, first entity data indicating first characteristics associated with the first entity. For example, the insurer system may include a database of entity data associated with entities that have acquired one or more insurance policies from the insurer. Those insurance policies may include, for example, general liability insurance, product liability insurance, etc. The information may include, for example, an identifier of a given entity, one or more industries associated with the entity, a revenue associated with the entity, a profit associated with the entity, an indication of intellectual-property litigation history, a number of employees associated with the entity, an indication of the insurance policies held by the entity, and/or a monetary amount paid by the entity to the insurer. Additionally, the entity data may be received from one or more entity devices associated with the first entity and/or from the first entity itself.

At block 604, the process 600 may include generating, utilizing a predictive model and based at least in part on the first entity data, a joint probability value indicating a likelihood and/or expected monetary amount of loss associated with the first entity. For example, an entity-rating component may receive the entity data, which may be filtered, configured, and/or otherwise formatted for input into predictive models. The entity-rating component may send the entity data, as formatted, to the predictive models along with, in examples, instructions for generating output. The entity-rating component may be configured to generate features and/or feature vectors utilizing the entity data for input into the predictive models. The predictive models may be configured to accept the features and/or feature vectors corresponding to the entity data. The predictive models may utilize the features and/or feature vectors to generate output data associated with the entity. For example, the output data may include a frequency value indicating an anticipated frequency of the entity being involved in defending against a claim involving intellectual property. The output data may also include a severity value indicating a monetary amount and/or a range of monetary amounts of anticipated damage to the entity associated with the claim involving intellectual property. The output data may also include an indication of a most-probable type of intellectual-property claim that may be levied against the entity based at least in part on the industry in which the entity operates and/or the products and/or services offered by the entity. The output data may also include a probability distribution of loss, which may represent a graph showing probabilities that a given loss amount will occur for the entity. The output data may also include one or more confidence values associated with other portions of the output data. In examples, the process 600 may include determining, based at least in part on the first entity data, a frequency value indicating an anticipated frequency of the first entity being involved in defending the claim of intellectual-property infringement. The process 600 may also include determining, based at least in part on the first entity data, a severity value indicating an anticipated monetary amount associated with the claim of intellectual-property infringement. In these examples, generating the joint probability value may be based at least in part on the frequency value and the severity value.

At block 606, the process 600 may include generating, based at least in part on the first entity data, a first prioritization value associated with the first entity, the first prioritization value indicating a likelihood that the first entity will acquire an insurance policy insuring against the claim of intellectual-property infringement. For example, a prioritization component may be configured to determine a ranking of entities associated with the insurer system. For example, the prioritization component may score some or all of the entity characteristics based at least in part on one or more machine learning models and/or utilizing heuristics. By way of example, each score may be on a given scale, such as from −5 to +5, with +5 representing a highest possible score for a given characteristic. It should be understood that "scoring" refers to assigning a characteristic and/or an entity a value or indicator, and other methodologies for assigning values and/or indicators is included in this disclosure. It should be further understood that the scales provided herein are provided by way of illustration, and not as a limitation. Other scales and/or increments also includes in this disclosure.

By way of example, the industry associated with the entity may be scored, the revenue associated with the entity may be scored, the number of intellectual-property infringement lawsuits that the entity has been involved in may be scored, the types of insurance policies held by the entity may be scored, and/or the monetary amount paid to the insurer may be scored. In a given example, an entity associated with innovative technologies, such as a technology sector, computing sector, and/or electronic device sector may be scored highly, such as a +5, while sectors such as food sectors and retail sectors may be scored lower, such as a −5. Additionally, an entity associated with a high revenue may receive a higher score than an entity with comparatively lower revenue. Additionally, an entity involved in, for example, 1-5 lawsuits involving intellectual property may be scored higher than an entity involved in more than 5 lawsuits or no lawsuits involving intellectual property. Additionally, an entity that holds insurance policies associated with cyber protection and/or product liability may be scored higher than entities without insurance policies or with other types of insurance policies, such as general liability insurance. Additionally, entities with a higher degree of spending on insurance policies may be scored higher than entities with comparatively less spending.

In examples, the process 600 may include determining, based at least in part on the first entity data, a score associated with individual ones of the first characteristics. The process 600 may also include determining, based at least in part on the industry identifier, a weighted score for at least a portion of the first characteristics. In these examples, generating the first prioritization value may be based at least in part on the weighted score for the at least the portion of the first characteristics.

At block 608, the process 600 may include receiving, from the insurer system, second entity data indicating second characteristics associated with a second entity. Receiving the second entity data may be performed in the same or a similar manner as receiving the first entity data, as described above. The second characteristics may be of the same or similar types as the first characteristics, but as applied to the second entity.

At block 610, the process 600 may include generating, based at least in part on the second entity data, a second prioritization value associated with the second entity. Generating the second prioritization value may be performed in the same or a similar manner as generating the first prioritization value, as described above.

At block 612, the process 600 may include generating, based at least in part on the first prioritization value and the second prioritization value, a ranking indicating that the first entity is more prioritized than the second entity. For example, some or all of the scores may be weighted by the prioritization component based at least in part on, for example, the industry associated with the entity and/or prior rankings performed by the broker system. The scores and/or weighted scores may be aggregated to generate a prioritization value for a given entity. The prioritization value may be analyzed in association with one or more other prioritization values associated with other entities to generate the ranking of the entities. By so doing, the broker system may determine which entities are most likely to acquire an insurance policy insuring against claims involving intellectual property. It should be understood that when scores and/or entities are compared as described herein, a particular scoring system will determine which score and/or entity is more favorable than other scores and/or entities. For example, when a scoring system indicates that higher values are associated with more favorable scores, a highest score will be considered most favorable. In other scoring systems that indicate lower values are associated with more favorable scores, a lowest score will be considered most favorable.

At block 614, the process 600 may include generating a recommendation including the joint probability value and the ranking. For example, a recommendation component may be configured to identify, determine, and/or generate recommendations associated with the output of the entity-rating component and/or the prioritization component and/or the cost component, for example. By way of example, a given recommendation may include the ranking of entities as output by the prioritization component. In these examples, the recommendation may include a naming indicator for some or all of the entities as well as, in examples, the prioritization value associated with the entities. The naming indicators may be arranged such that the entity associated with the most favorable prioritization value is listed and/or displayed first. Additionally, the recommendation may be configured such that the naming indicators for the entities are linked or otherwise selectable. For example, the recommendation, when viewed on a display of the insurer system, may include selectable links that, when selected, may cause information associated with the selected entity to be displayed via one or more user interfaces of the insurer system. The information may include information identified, determined, and/or generated by the predictive models and/or the entity-rating component. For example, the information may include a contact associated with the entity, a frequency value and/or likelihood that the entity will be involved in a claim involving intellectual property, the severity value and/or range of values, the event type, and/or the probability distribution of loss. By way of further example, the recommendation may include loss likelihoods and/or seventies for entities associated with the same industry in which a given entity operates. By providing industry loss likelihoods and/or severities, a comparison between the industry in general and a given entity may be provided.

At block 616, the process 600 may include sending the recommendation to the insurer system.

Additionally, or alternatively, the process 600 may include determining, based at least in part on the first entity data, a loss-probability distribution associated with the claim of intellectual-property infringement. The process 600 may also include identifying one or more terms associated with the insurance policy, and generating, based at least in part on the loss-probability distribution and the one or more terms, a cost recommendation indicating a recommended cost to the first entity for the insurance policy. In these examples, the recommendation may include the cost recommendation.

Figure 7:
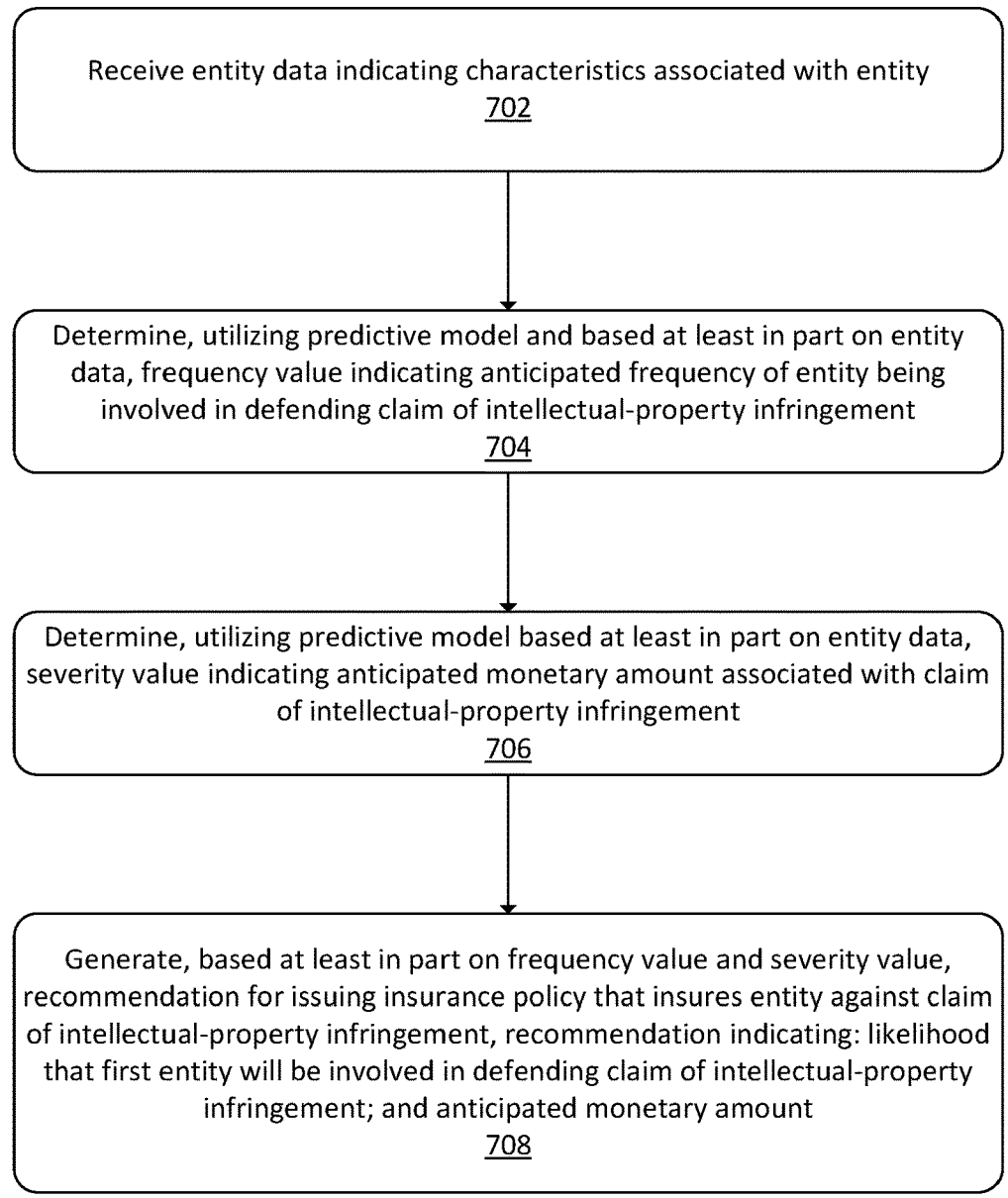
FIG. 7 illustrates a flow diagram of an example process for entity analysis to generate a recommendation for issuing an insurance policy covering intellectual-property claims.

FIG. 7 illustrates a flow diagram of an example process for entity analysis to generate a recommendation for issuing an insurance policy covering intellectual-property infringement. The order in which the operations or steps are described is not intended to be construed as a limitation, and any number of the described operations may be combined in any order and/or in parallel to implement process 700.

At block 702, the process 700 may include receiving entity data indicating characteristics associated with an entity. For example, the insurer system may include a database of entity data associated with entities that have acquired one or more insurance policies from the insurer. Those insurance policies may include, for example, general liability insurance, product liability insurance, etc. The information may include, for example, an identifier of a given entity, one or more industries associated with the entity, a revenue associated with the entity, a profit associated with the entity, an indication of intellectual-property litigation history, a number of employees associated with the entity, an indication of the insurance policies held by the entity, and/or a monetary amount paid by the entity to the insurer. Additionally, the entity data may be received from one or more entity devices associated with the entity.

At block 704, the process 700 may include determining, utilizing a predictive model and based at least in part on the entity data, a frequency value indicating an anticipated frequency of the entity being involved in defending a claim of intellectual-property infringement. For example, an entity-rating component may receive the entity data, which may be filtered, configured, and/or otherwise formatted for input into predictive models. The entity-rating component may send the entity data, as formatted, to the predictive models along with, in examples, instructions for generating output. The entity-rating component may be configured to generate features and/or feature vectors utilizing the entity data for input into the predictive models. The predictive models may be configured to accept the features and/or feature vectors corresponding to the entity data. The predictive models may utilize the features and/or feature vectors to generate output data associated with the entity. For example, the output data may include the frequency value indicating an anticipated frequency of the entity being involved in defending against a claim involving intellectual property. The output data may also include a severity value indicating a monetary amount and/or a range of monetary amounts of anticipated damage to the entity associated with the claim involving intellectual property. The output data may also include an indication of a most-probable type of intellectual-property claim that may be levied against the entity based at least in part on the industry in which the entity operates and/or the products and/or services offered by the entity. The output data may also include a probability distribution of loss, which may represent a graph showing probabilities that a given loss amount will occur for the entity. The output data may also include one or more confidence values associated with other portions of the output data.

At block 706, the process 700 may include determining, utilizing the predictive model based at least in part on the entity data, a severity value indicating an anticipated monetary amount associated with the claim of intellectual-property infringement. The predictive model may be similar to the predictive model described above with respect to block 704. The output data from the predictive model may include the severity value indicating a monetary amount and/or a range of monetary amounts of anticipated damage to the entity associated with the claim involving intellectual property. The output data may also include an indication of a most-probable type of intellectual-property claim that may be levied against the entity based at least in part on the industry in which the entity operates and/or the products and/or services offered by the entity. The output data may also include a probability distribution of loss, which may represent a graph showing probabilities that a given loss amount will occur for the entity. The output data may also include one or more confidence values associated with other portions of the output data.

At block 708, the process 700 may include generating, based at least in part on the frequency value and the severity value, a recommendation for issuing an insurance policy that insures the entity against the claim of intellectual-property infringement. The recommendation may indicate a likelihood that the first entity will be involved in defending the claim of intellectual-property infringement and/or the anticipated monetary amount. For example, a recommendation component may be configured to identify, determine, and/or generate recommendations associated with the output of the entity-rating component, for example. By way of example, a given recommendation may include a contact associated with the entity, a frequency value and/or likelihood that the entity will be involved in a claim involving intellectual property, the severity value and/or range of values, the event type, and/or the probability distribution of loss. By way of further example, the recommendation may include loss likelihoods and/or severities for entities associated with the same industry in which a given entity operates. By providing industry loss likelihoods and/or severities, a comparison between the industry in general and a given entity may be provided.

Additionally, or alternatively, the process 700 may include generating, based at least in part on the first entity data, a first prioritization value associated with the first entity, the first prioritization value indicating a likelihood that the first entity will acquire the insurance policy. The process 700 may also include receiving second entity data indicating second characteristics associated with a second entity. The process 700 may also include generating, based at least in part on the second entity data, a second prioritization value associated with the second entity. The process 700 may also include generating, based at least in part on the first prioritization value and the second prioritization value, a ranking indicating that the first entity is more prioritized than the second entity. In these examples, the recommendation may indicate the ranking. The process 700 may also include determining, based at least in part on the first entity data, a score associated with individual ones of the first characteristics, and determining, based at least in part on an industry identifier associated with the first entity, a weighted score for at least a portion of the first characteristics. In these examples, generating the first prioritization value may be based at least in part on the weighted score for the at least the portion of the first characteristics.

Additionally, or alternatively, the process 700 may include determining, based at least in part on the entity data, a loss-probability distribution associated with the entity. The process 700 may also include identifying one or more terms associated with the insurance policy. The process 700 may also include generating, based at least in part on the loss-probability distribution and the one or more terms, a cost recommendation indicating a recommended cost to the entity for the insurance policy. In these examples, the recommendation may include the cost recommendation.

Additionally, or alternatively, the process 700 may include receiving information indicating intellectual property associated with the entity. The process 700 may also include determining a degree of coverage of the intellectual property with respect to an industry associated with the entity. In these examples, generating the recommendation may be based at least in part on the degree of coverage.

Additionally, or alternatively, the process 700 may include receiving, from at least one of an insurer system or an entity system, feedback data indicating that the entity acquired the insurance policy. The process 700 may also include training the predictive model based at least in part on the feedback data.

Additionally, or alternatively, the process 700 may include identifying a second country in which intellectual-property infringement may be asserted against the entity. The process 700 may also include determining, utilizing the predictive model, a weighting value associated with litigation in the second country. In these examples, generating the recommendation may be based at least in part on the weighting value.

Figure 8:
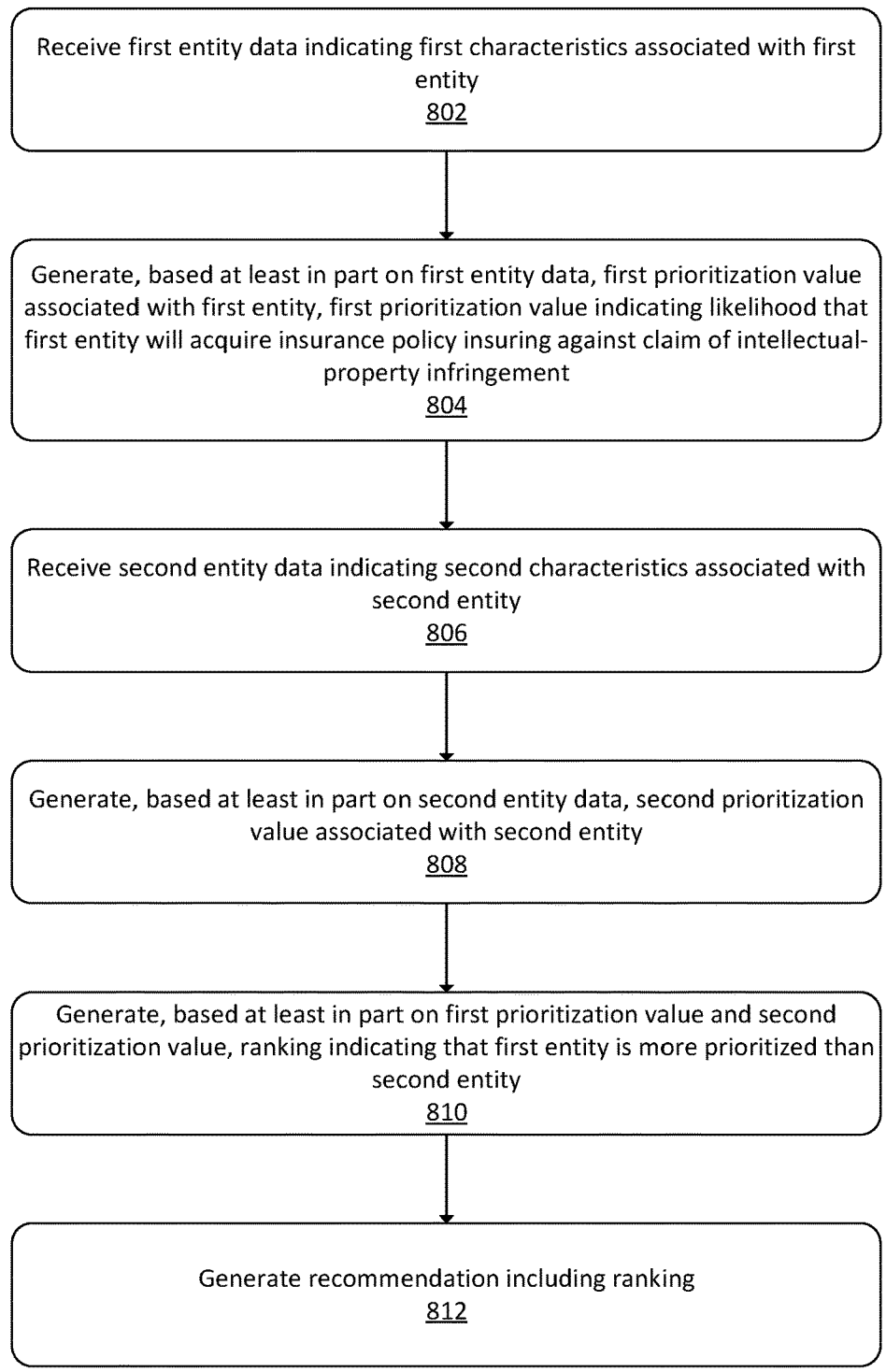
FIG. 8 illustrates a flow diagram of an example process for entity prioritization.

FIG. 8 illustrates a flow diagram of an example process for entity prioritization. The order in which the operations or steps are described is not intended to be construed as a limitation, and any number of the described operations may be combined in any order and/or in parallel to implement process 800.

At block 802, the process 800 may include receiving first entity data indicating first characteristics associated with a first entity. For example, the insurer system may include a database of entity data associated with entities that have acquired one or more insurance policies from the insurer. Those insurance policies may include, for example, general liability insurance, product liability insurance, etc. The information may include, for example, an identifier of a given entity, one or more industries associated with the entity, a revenue associated with the entity, a profit associated with the entity, an indication of intellectual-property litigation history, a number of employees associated with the entity, an indication of the insurance policies held by the entity, and/or a monetary amount paid by the entity to the insurer. Additionally, the entity data may be received from one or more entity devices associated with the first entity.

At block 804, the process 800 may include generating, based at least in part on the first entity data, a first prioritization value associated with the first entity, the first prioritization value indicating a likelihood that the first entity will acquire an insurance policy insuring against a claim of intellectual-property infringement. For example, a prioritization component may be configured to determine a ranking of entities associated with the insurer system. For example, the prioritization component may score some or all of the entity characteristics based at least in part on one or more machine learning models and/or utilizing heuristics. By way of example, each score may be on a given scale, such as from −5 to +5, with +5 representing a highest possible score for a given characteristic. It should be understood that "scoring" refers to assigning a characteristic and/or an entity a value or indicator, and other methodologies for assigning values and/or indicators is included in this disclosure. It should be further understood that the scales provided herein are provided by way of illustration, and not as a limitation. Other scales and/or increments also includes in this disclosure.

By way of example, the industry associated with the entity may be scored, the revenue associated with the entity may be scored, the number of intellectual-property infringement lawsuits that the entity has been involved in may be scored, the types of insurance policies held by the entity may be scored, and/or the monetary amount paid to the insurer may be scored. In a given example, an entity associated with innovative technologies, such as a technology sector, computing sector, and/or electronic device sector may be scored highly, such as a +5, while sectors such as food sectors and retail sectors may be scored lower, such as a −5. Additionally, an entity associated with a high revenue may receive a higher score than an entity with comparatively lower revenue. Additionally, an entity involved in, for example, 1-5 lawsuits involving intellectual property may be scored higher than an entity involved in more than 5 lawsuits or no lawsuits involving intellectual property. Additionally, an entity that holds insurance policies associated with cyber protection and/or product liability may be scored higher than entities without insurance policies or with other types of insurance policies, such as general liability insurance. Additionally, entities with a higher degree of spending on insurance policies may be scored higher than entities with comparatively less spending.

In examples, the process 800 may include determining, based at least in part on the first entity data, a score associated with individual ones of the first characteristics. The process 800 may also include determining, based at least in part on an industry identifier associated with the first entity, a weighted score for at least a portion of the first characteristics. In these examples, generating the first prioritization value may be based at least in part on the weighted score for the at least the portion of the first characteristics.

At block 806, the process 800 may include receiving second entity data indicating second characteristics associated with a second entity. Receiving the second entity data may be performed in the same or a similar manner as receiving the first entity data, as described above.

At block 808, the process 800 may include generating, based at least in part on the second entity data, a second prioritization value associated with the second entity. Generating the second prioritization value may be performed in the same or a similar manner as generating the first prioritization value.

At block 810, the process 800 may include generating, based at least in part on the first prioritization value and the second prioritization value, a ranking indicating that the first entity is more prioritized than the second entity. For example, some or all of the scores may be weighted by the prioritization component based at least in part on, for example, the industry associated with the entity and/or prior rankings performed by the broker system. The scores and/or weighted scores may be aggregated to generate a prioritization value for a given entity. The prioritization value may be analyzed in association with one or more other prioritization values associated with other entities to generate the ranking of the entities. By so doing, the broker system may determine which entities are most likely to acquire an insurance policy insuring against claims involving intellectual property. It should be understood that when scores and/or entities are compared as described herein, a particular scoring system will determine which score and/or entity is more favorable than other scores and/or entities. For example, when a scoring system indicates that higher values are associated with more favorable scores, a highest score will be considered most favorable. In other scoring systems that indicate lower values are associated with more favorable scores, a lowest score will be considered most favorable.

At block 812, the process 800 may include generating a recommendation including the ranking. For example, a recommendation component may be configured to identify, determine, and/or generate recommendations associated with the output of the entity-rating component and/or the prioritization component and/or the cost component, for example. By way of example, a given recommendation may include the ranking of entities as output by the prioritization component. In these examples, the recommendation may include a naming indicator for some or all of the entities as well as, in examples, the prioritization value associated with the entities. The naming indicators may be arranged such that the entity associated with the most favorable prioritization value is listed and/or displayed first. Additionally, the recommendation may be configured such that the naming indicators for the entities are linked or otherwise selectable. For example, the recommendation, when viewed on a display of the insurer system, may include selectable links that, when selected, may cause information associated with the selected entity to be displayed via one or more user interfaces of the insurer system.

Additionally, or alternatively, the process 800 may include determining, utilizing a predictive model and based at least in part on the first entity data, a frequency value indicating an anticipated frequency of the first entity being involved in the claim for intellectual-property infringement. The process 800 may also include determining, utilizing the predictive model based at least in part on the first entity data, a severity value indicating an anticipated monetary amount associated with the claim of intellectual-property infringement. In these examples, the recommendation may indicate the frequency value and the severity value.

Additionally, or alternatively, the process 800 may include receiving, from at least one of an insurer system or an entity system, feedback data indicating that the first entity acquired the insurance policy. The process 800 may also include training the predictive model based at least in part on the feedback data.

Additionally, or alternatively, the process 800 may include determining, based at least in part on the first entity data, a loss-probability distribution associated with the first entity. The process 800 may also include identifying one or more terms associated with the insurance policy. The process 800 may also include generating, based at least in part on the loss-probability distribution and the one or more terms, a cost recommendation indicating a recommended cost to the first entity for the insurance policy. In these examples, the recommendation may include the cost recommendation.

Additionally, or alternatively, the process 800 may include receiving information indicating intellectual property associated with the first entity. The process 800 may also include determining a degree of coverage of the intellectual property with respect to an industry associated with the first entity. In these examples, generating the recommendation may be based at least in part on the degree of coverage.

Additionally, or alternatively, the process 800 may include identifying one or more countries in which intellectual-property infringement may be asserted against the first entity. The process 800 may also include determining, utilizing a predictive model, a weighting value associated with litigation in a given country. In these examples, generating the recommendation may be based at least in part on the weighting value.

Additionally, or alternatively, the processes described herein may include determining, based at least in part on entity data and utilizing a predictive model an availability, to the entity, of an insurance policy to insure against an intellectual-property claim and/or at least one term of an insurance policy. In these examples, the recommendations described herein may include the availability and/or the at least one term of the insurance policy.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:
1. A system comprising:
one or more processors; and
non-transitory computer-readable media storing computer-executable instructions that, when executed by the one or more processors, cause the one or more processors to perform operations comprising:
receiving, from at least one of an insurer system or an entity device, first entity data indicating first characteristics associated with a first entity;
generating, utilizing a predictive model and based at least in part on the first entity data, a joint probability value indicating a likelihood and expected monetary amount of loss associated with the first entity being involved in defending a claim of intellectual-property infringement;
determining, based at least in part on the first entity data, a loss-probability distribution associated with the claim of intellectual-property infringement, the loss-probability distribution indicating a severity of the claim of intellectual-property infringement and a frequency associated with the claim of intellectual-property infringement, wherein the joint probability value is based at least in part on the loss-probability distribution;
generating, based at least in part on the first entity data and utilizing a predictive model trained utilizing feedback data indicating acceptance of insurance policies by other entities, a first prioritization value associated with the first entity, the first prioritization value indicating a likelihood that the first entity will acquire an insurance policy insuring against the claim of intellectual-property infringement;

receiving, from the insurer system, second entity data indicating second characteristics associated with a second entity;

generating, based at least in part on the second entity data and utilizing the predictive model, a second prioritization value associated with the second entity;

generating, based at least in part on the first prioritization value and the second prioritization value, a ranking indicating that the first entity is more prioritized than the second entity; and generating a recommendation including the joint probability value and the ranking.

2. The system of claim 1, wherein the first entity data includes an industry identifier associated with the first entity, a revenue associated with the first entity, an indication of intellectual-property litigation history, and a number of employees of the first entity.

3. The system of claim 1, wherein the first characteristics include an industry identifier associated with the first entity, a number of patent-infringement lawsuits the first entity has been involved in, a revenue associated with the first entity, an indication of one or more other insurance policies held by the first entity, and a monetary amount provided by the first entity to an insurer associated with the insurer system, and the operations further comprise:

determining, based at least in part on the first entity data, a score associated with individual ones of the first characteristics;

determining, based at least in part on the industry identifier, a weighted score for at least a portion of the first characteristics; and wherein generating the first prioritization value comprises generating the first prioritization value based at least in part on the weighted score for the at least the portion of the first characteristics.

4. The system of claim 1, the operations further comprising:

identifying one or more terms associated with the insurance policy;

generating, based at least in part on the loss-probability distribution and the one or more terms, a cost recommendation indicating a recommended cost to the first entity for the insurance policy; and wherein the recommendation includes the cost recommendation.

5. A method comprising:

receiving first entity data indicating first characteristics associated with a first entity;

generating, based at least in part on the first entity data and utilizing a predictive model trained utilizing feedback data indicating acceptance of insurance policies by other entities, a first prioritization value associated with the first entity, the first prioritization value indicating a likelihood that the first entity will acquire an insurance policy insuring against a claim of intellectual-property infringement;

determining, based at least in part on the first entity data, a loss-probability distribution associated with the claim of intellectual-property infringement, the loss-probability distribution indicating a severity of the claim of intellectual-property infringement and a frequency associated with the claim of intellectual-property infringement;

generating a joint probability value indicating a likelihood and expected monetary amount of loss associated with the first entity being involved in defending the claim of intellectual-property infringement based, the joint probability value based at least in part on the loss-probability distribution;

receiving second entity data indicating second characteristics associated with a second entity;

generating, based at least in part on the second entity data and utilizing the predictive model, a second prioritization value associated with the second entity;

generating, based at least in part on the first prioritization value and the second prioritization value, a ranking indicating that the first entity is more prioritized than the second entity; and generating a recommendation including the ranking and the joint probability value.

6. The method of claim 5, the operations further comprising:

determining, based at least in part on the first entity data, a score associated with individual ones of the first characteristics;

determining, based at least in part on an industry identifier associated with the first entity, a weighted score for at least a portion of the first characteristics; and wherein generating the first prioritization value comprises generating the first prioritization value based at least in part on the weighted score for the at least the portion of the first characteristics.

7. The method of claim 5, wherein the first entity data includes:

an industry identifier associated with the first entity;
a revenue associated with the first entity;
an indication of intellectual-property litigation history; and
a number of employees of the first entity.

8. The method of claim 5, further comprising:

receiving information indicating intellectual property associated with the first entity;

determining a degree of coverage of the intellectual property with respect to an industry associated with the first entity; and wherein generating the recommendation comprises generating the recommendation based at least in part on the degree of coverage.

9. The method of claim 5, further comprising:

storing data corresponding to one or more prior rankings that are unassociated with the first prioritization value and the second prioritization value; and wherein generating the ranking comprises generating the ranking based at least in part on the one or more prior rankings.

10. The method of claim 5, wherein the claim of intellectual-property infringement is associated with a first country, and the operations further comprise:

identifying a second country in which intellectual-property infringement may be asserted against the first entity;

determining, utilizing a predictive model, a weighting value associated with litigation in the second country; and wherein generating the recommendation comprises generating the recommendation based at least in part on the weighting value.

11. A system, comprising:
one or more processors; and non-transitory computer-readable media storing computer-executable instructions that, when executed by the one or more processors, cause the one or more processors to perform operations comprising:

receiving first entity data indicating first characteristics associated with a first entity;

generating, based at least in part on the first entity data and utilizing a predictive model trained utilizing feedback data indicating acceptance of insurance policies by other entities, a first prioritization value associated with the first entity, the first prioritization value indicating a likelihood that the first entity will acquire an insurance policy insuring against a claim of intellectual-property infringement;

determining, based at least in part on the first entity data, a loss-probability distribution associated with the claim of intellectual-property infringement, the loss-probability distribution indicating a severity of the claim of intellectual-property infringement and a frequency associated with the claim of intellectual-property infringement;

generating a joint probability value indicating a likelihood and expected monetary amount of loss associated with the first entity being involved in defending the claim of intellectual-property infringement based, the joint probability value based at least in part on the loss-probability distribution;

receiving second entity data indicating second characteristics associated with a second entity;

generating, based at least in part on the second entity data and utilizing the predictive model, a second prioritization value associated with the second entity;

generating, based at least in part on the first prioritization value and the second prioritization value, a ranking indicating that the first entity is more prioritized than the second entity; and generating a recommendation including the ranking and the joint probability value.

12. The system of claim 11, the operations further comprising:

determining, based at least in part on the first entity data, a score associated with individual ones of the first characteristics;

determining, based at least in part on an industry identifier associated with the first entity, a weighted score for at least a portion of the first characteristics; and wherein generating the first prioritization value comprises generating the first prioritization value based at least in part on the weighted score for the at least the portion of the first characteristics.

13. The system of claim 11, wherein the recommendation indicates the frequency and the severity.

14. The system of claim 13, wherein the first entity data includes:

an industry identifier associated with the first entity;

a revenue associated with the first entity;

an indication of intellectual-property litigation history; and a number of employees of the first entity.

15. The system of claim 13, the operations further comprising:

storing data corresponding to one or more prior rankings that are unassociated with the first prioritization value and the second prioritization value; and wherein generating the ranking comprises generating the ranking based at least in part on the one or more prior rankings.

16. The system of claim 11, the operations further comprising:

identifying one or more terms associated with the insurance policy; and generating, based at least in part on the loss-probability distribution and the one or more terms, a cost recommendation indicating a recommended cost to the first entity for the insurance policy; and wherein the recommendation includes the cost recommendation.

17. The system of claim 11, the operations further comprising:

receiving information indicating intellectual property associated with the first entity;

determining a degree of coverage of the intellectual property with respect to an industry associated with the first entity; and wherein generating the recommendation comprises generating the recommendation based at least in part on the degree of coverage.

18. The system of claim 11, wherein the claim of intellectual-property infringement is associated with a first country, and the operations further comprise:

identifying a second country in which intellectual-property infringement may be asserted against the first entity;

determining, utilizing a predictive model, a weighting value associated with litigation in the second country; and wherein generating the recommendation comprises generating the recommendation based at least in part on the weighting value.

* * * * *